United States Patent
Harada

(10) Patent No.: US 12,223,292 B2
(45) Date of Patent: Feb. 11, 2025

(54) PRINTING APPARATUS AND USB EQUIPMENT

(71) Applicant: SEIKO EPSON CORPORATION, Tokyo (JP)

(72) Inventor: Takeshi Harada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 348 days.

(21) Appl. No.: 18/048,901

(22) Filed: Oct. 24, 2022

(65) Prior Publication Data
US 2023/0131341 A1    Apr. 27, 2023

(30) Foreign Application Priority Data
Oct. 26, 2021   (JP) .................. 2021-174425

(51) Int. Cl.
*G06F 7/57*  (2006.01)
*G06F 3/12*  (2006.01)

(52) U.S. Cl.
CPC .............. *G06F 7/57* (2013.01); *G06F 3/1202* (2013.01)

(58) Field of Classification Search
USPC ....................................... 358/1.15
See application file for complete search history.

(56) References Cited

U.S. PATENT DOCUMENTS

| | | | |
|---|---|---|---|
| 2017/0161226 A1* | 6/2017 | Gerber | G06F 13/385 |
| 2023/0063866 A1* | 3/2023 | Harada | B41J 29/38 |
| 2023/0068350 A1* | 3/2023 | Harada | H04N 1/00901 |
| 2023/0068782 A1* | 3/2023 | Harada | G06F 13/4072 |

FOREIGN PATENT DOCUMENTS

JP        2002-163051 A      6/2002

* cited by examiner

*Primary Examiner* — Jacky X Zheng
(74) *Attorney, Agent, or Firm* — Global IP Counselors, LLP

(57) ABSTRACT

There is provided a printing apparatus including: a first receptacle connector that couples a first external device and an arithmetic section; a second receptacle connector that couples a second external device and the arithmetic section; and a USB controller that causes the arithmetic section to function as the device or the host based on a first electric signal input from the first external device and a second electric signal input from the second external device, in which, when the first external device is coupled, the USB controller causes the arithmetic section to function as the device when the second external device that functions as the device is coupled, causes the arithmetic section to function as the device when the second external device that functions as the host is coupled, and causes the arithmetic section to function as the device when the second external device is not coupled.

10 Claims, 15 Drawing Sheets

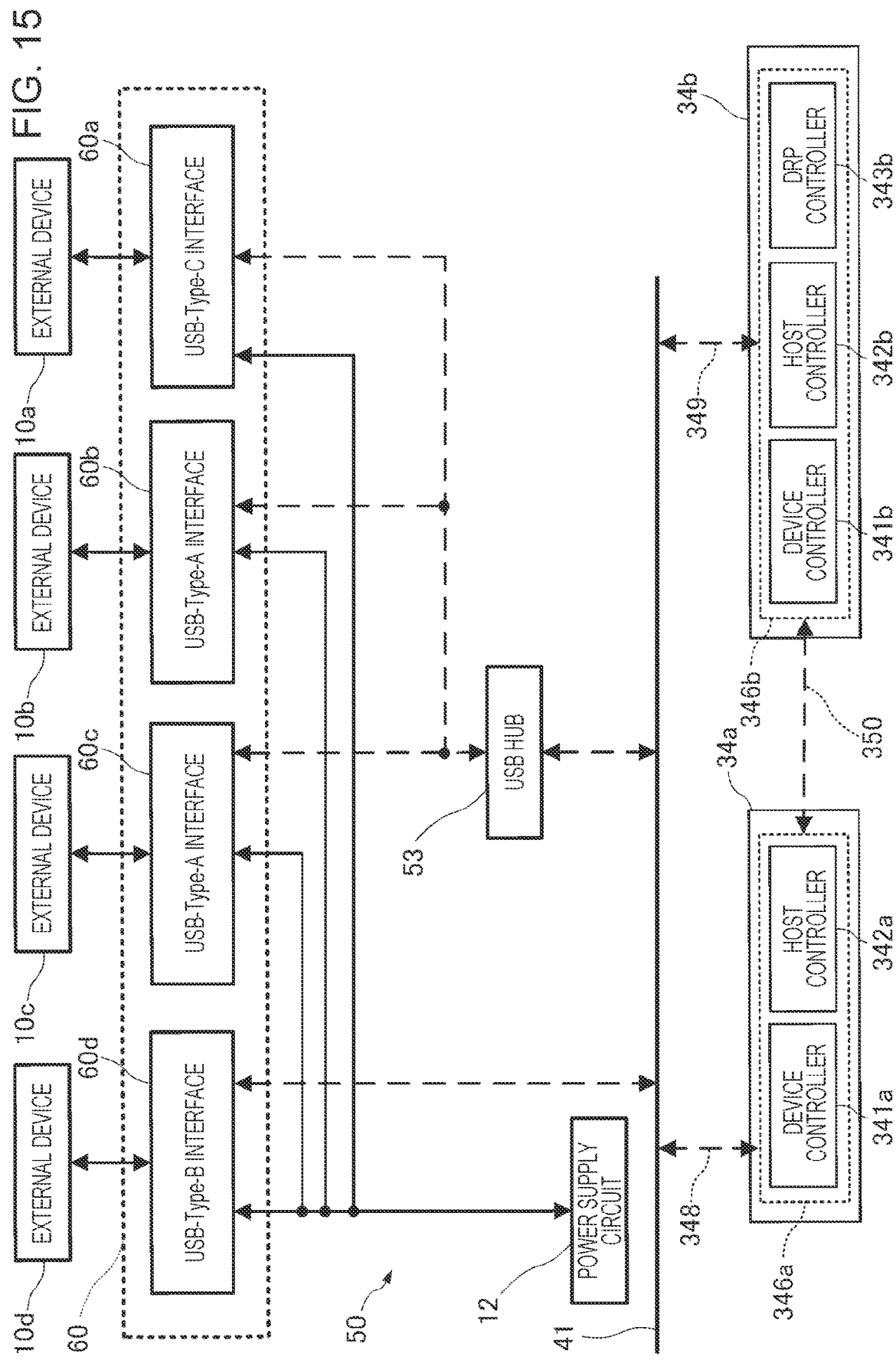

PRINTING APPARATUS AND USB EQUIPMENT

The present application is based on, and claims priority from JP Application Serial Number 2021-174425, filed Oct. 26, 2021, the disclosure of which is hereby incorporated by reference herein in its entirety.

BACKGROUND

1. Technical Field

The present disclosure relates to a printing apparatus and USB equipment.

2. Related Art

In recent years, the USB-Type-C interface became widespread, and various devices are equipped with the USB-Type-C interface. With the spread of such a USB-Type-C interface, products equipped with a USB-Type-C interface in addition to the USB-Type-B interface became widespread in printing apparatuses or electronic devices such as projectors.

The external device coupled to the USB-Type-C interface can be in either a host state or a device state. Therefore, it is necessary for the printing apparatus or the electronic device such as a projector to switch between its own host state or device state according to the host state of the device state of the coupled external device. JP-A-2002-163051 discloses a printing apparatus that functions as a device with respect to an external device that functions as a host coupled to a USB-Type-B interface.

However, in a printing apparatus including a USB-Type-B interface and a USB-Type-C interface, for example, an external device that functions as a host and an external device that functions as a device may be coupled at the same time. In such a case, in the printing apparatus, there is a concern that the device state and the host state coexist, and there is a problem to be improved, such as unstable communication state.

SUMMARY

According to an aspect of the present disclosure, there is provided a printing apparatus including: a first receptacle connector that couples a first external device that functions as a host and an arithmetic section to communicate with each other; a second receptacle connector that couples a second external device that functions as the host or a device and the arithmetic section to communicate with each other; and a USB controller that causes the arithmetic section to function as the device or the host based on a first electric signal input from the first external device via the first receptacle connector and a second electric signal input from the second external device via the second receptacle connector, in which, when the first external device and the first receptacle connector are coupled, the USB controller causes the arithmetic section to function not as the host but as the device when the second external device that functions as the device is coupled to the second receptacle connector, causes the arithmetic section to function as the device when the second external device that functions as the host is coupled to the second receptacle connector, and causes the arithmetic section to function as the device when the second external device is not coupled to the second receptacle connector.

According to another aspect of the present disclosure, there is provided USB equipment including: a first receptacle connector that couples a first external device that functions as a host and a USB device to communicate with each other; a second receptacle connector that couples a second external device that functions as the host or a device and the USB device to communicate with each other; and a USB controller that causes the USB device to function as the device or the host based on a first electric signal input from the first external device via the first receptacle connector and a second electric signal input from the second external device via the second receptacle connector, in which, when the first external device and the first receptacle connector are coupled, the USB controller causes the USB device to function not as the host but as the device when the second external device that functions as the device is coupled to the second receptacle connector, causes the USB device to function as the device when the second external device that functions as the host is coupled to the second receptacle connector, and causes the USB device to function as the device when the second external device is not coupled to the second receptacle connector.

BRIEF DESCRIPTION OF THE DRAWINGS

FIG. 15 is a view illustrating a hardware configuration of a USB controller of a modification example.

DESCRIPTION OF EXEMPLARY EMBODIMENTS

Figure 1:
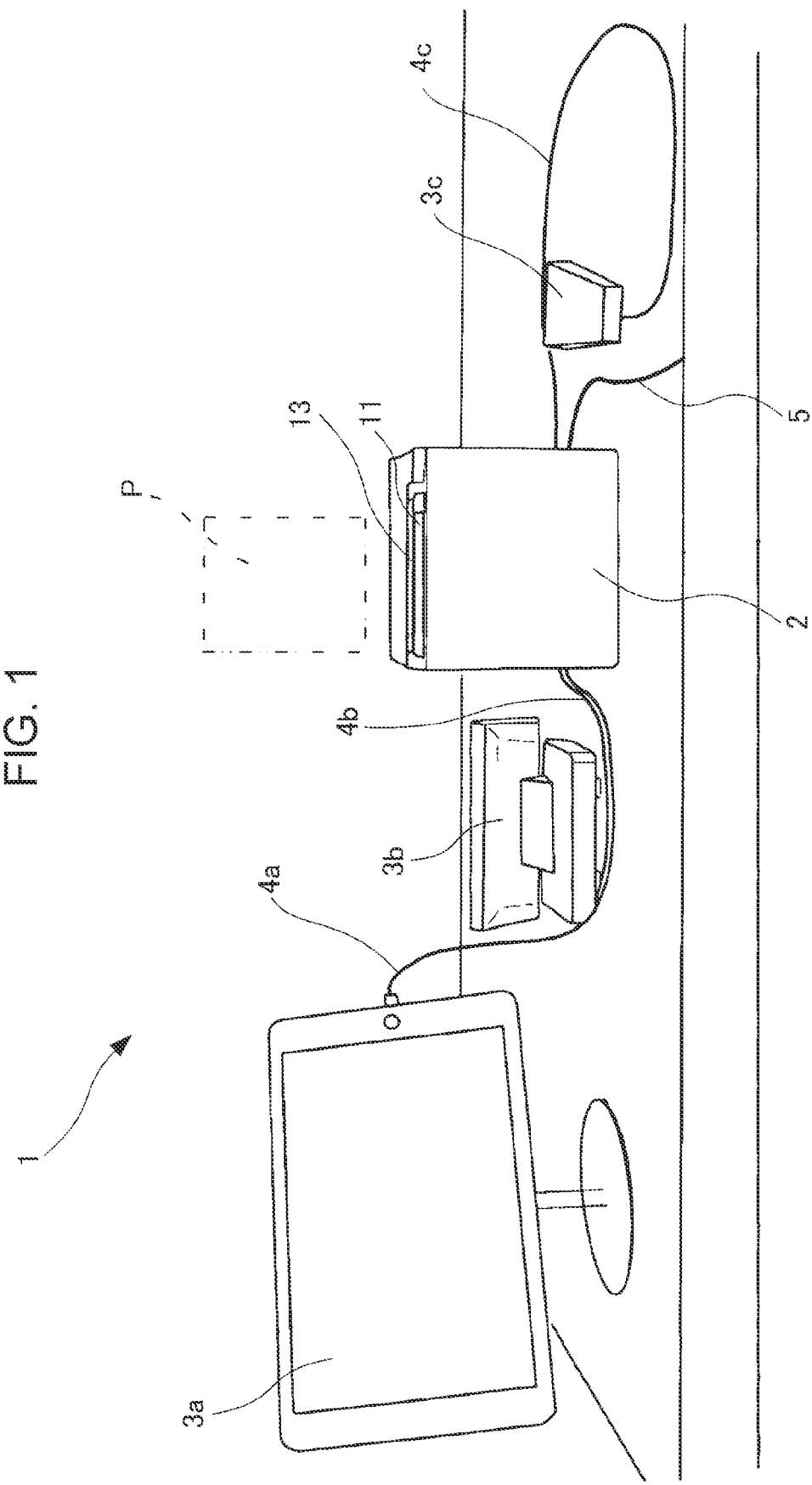
FIG. 1 is a view illustrating a schematic configuration of a printing system.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. In addition, not all of the configurations which will be described below are necessarily essential components of the present disclosure.

1. First Embodiment

1-1. Schematic Configuration of Printing System

FIG. 1 is a view illustrating a schematic configuration of a printing system 1 according to the present embodiment. The printing system 1 is used in a store, for example, and has a function of performing accounting according to products and services purchased by a customer, a function of informing the customer of information related to accounting, and a function of issuing a receipt according to the accounting. For example, the printing system 1 is an example of a point of sale (POS) system.

The printing system 1 includes a printing apparatus 2, a smart device 3a, a customer display 3b, and a handy scanner 3c. The printing system 1 may have a configuration in which some of these elements are omitted or changed, or other elements are added.

The printing apparatus 2 is supplied with electric power by being coupled to, for example, a commercial AC power source (not illustrated) via a power cable 5. The printing apparatus 2 to which the electric power is supplied performs printing on a medium P, and the medium P is discharged from a medium discharge port 13. In other words, the printed recording part of the medium P is discharged from the medium discharge port 13.

The smart device 3a, the customer display 3b, and the handy scanner 3c are examples of external devices that can be coupled to the printing apparatus 2 via a USB interface 60 included in the printing apparatus 2, as will be described later. Specifically, the smart device 3a is coupled to the printing apparatus 2 via a USB cable 4a, the customer display 3b is coupled to the printing apparatus 2 via a USB cable 4b, and the handy scanner 3c is coupled to the printing apparatus 2 via a USB cable 4c.

Although FIG. 1 illustrates an example in which the smart device 3a, the customer display 3b, and the handy scanner 3c are coupled to the printing apparatus 2, the number of external devices that can be coupled to the printing apparatus 2 is not limited to three. For example, the number of external devices that can be coupled to the printing apparatus 2 depends on the USB standard. According to the USB standard, the maximum number of external devices that can be coupled is 127, and thus the maximum number of external devices that can be coupled to the printing apparatus 2 is 127.

The smart device 3a is a terminal that can be carried by the user. For example, the smart device 3a is a tablet terminal or a smartphone, and the smart device 3a includes a communication section that performs data communication according to a predetermined communication standard, and communicates with the printing apparatus 2 via this communication section.

Here, unless otherwise specified, the user refers to a salesclerk who provides products or services to customers, or a trader who installs the printing system 1 in the store, and sets external devices such as the printing apparatus 2 and the smart device 3a.

The smart device 3a includes a battery and operates by the electric power charged in the battery. The smart device 3a is supplied with electric power from the printing apparatus 2 to charge the battery. Further, the smart device 3a is equipped with various applications for generating commands, print data, and the like for controlling the printing apparatus 2. For example, the application mounted on such the smart device 3a is an application corresponding to the POS system.

The smart device 3a transmits a command related to control and a command related to printing to the printing apparatus 2. Upon receiving these commands, the printing apparatus 2 stores these commands in a receiver buffer (not illustrated).

The control-related command includes, for example, a setting command for instructing format setting and a status request command for instructing a request for information related to the state of the printing apparatus 2. In response to this status request command, for example, the printing apparatus 2 transmits information indicating that printing is completed to the smart device 3a.

The command related to printing includes, for example, a print command for instructing printing, a line feed command for instructing line feed, a line stack command for instructing line stack, a cutter command for instructing to cut the medium P, and the like. The command related to printing includes a command for instructing drive to any of a thermal head 21, a transport section 23, and a cutting section 24 illustrated in FIG. 2.

The smart device 3a generates print data such as letters and images to be printed by the printing apparatus 2. The smart device 3a transmits a print command including the generated print data to the printing apparatus 2 according to a predetermined communication standard. The printing apparatus 2 executes a print command and prints letters, images, and the like on the medium P based on the print data.

The customer display 3b can be used, for example, by placing the customer display 3b on a counter table in a store. The customer who purchased the product at the store can confirm the price displayed on the customer display 3b and recognize the payment amount. Further, the customer display 3b may display the product name purchased by the customer, the payment method, the date and time of purchase, the name of the store where the customer purchased, and the like.

For example, when accounting and payment of purchased items by the customer himself or herself, such as a so-called self-checkout, the salesclerk who is the user may omit the customer display 3b from the printing system 1. In this case, it is preferable that the content displayed on the customer display 3b be displayed on the smart device 3a.

For example, it is preferable that the product name purchased by the customer, the payment method, the date and time of purchase, the name of the store where the customer purchased, and the like be displayed on the smart device 3a. In this manner, the salesclerk who is the user can reduce the power consumption of the printing system 1 by omitting the customer display 3b and reducing the number of external devices depending on the situation, and can simplify the configuration of the printing system 1.

The handy scanner 3c operates by receiving electric power supplied from the printing apparatus 2. The printing apparatus 2 inputs information related to the image scanned by the handy scanner 3c.

For example, the user scans a barcode attached to the product using the handy scanner 3c. Information related to the scanned image is output to the smart device 3a via the printing apparatus 2. The smart device 3a can acquire information related to a product, information related to the price, and the like.

Further, for example, a salesclerk who is a user scans a barcode presented by a customer by a smartphone or the like using the handy scanner 3c. Information related to the scanned image is output to the smart device 3a via the printing apparatus 2.

The smart device 3a can acquire information related to a payment method, information related to the payment amount, and the like. Based on these pieces of information, the smart device 3a may complete the payment of the fee via the online payment service and display the information related to the payment completion on the customer display 3b via the printing apparatus 2. Accordingly, the customer can confirm that the payment is completed.

1-2. Function of Printing System

Figure 2:
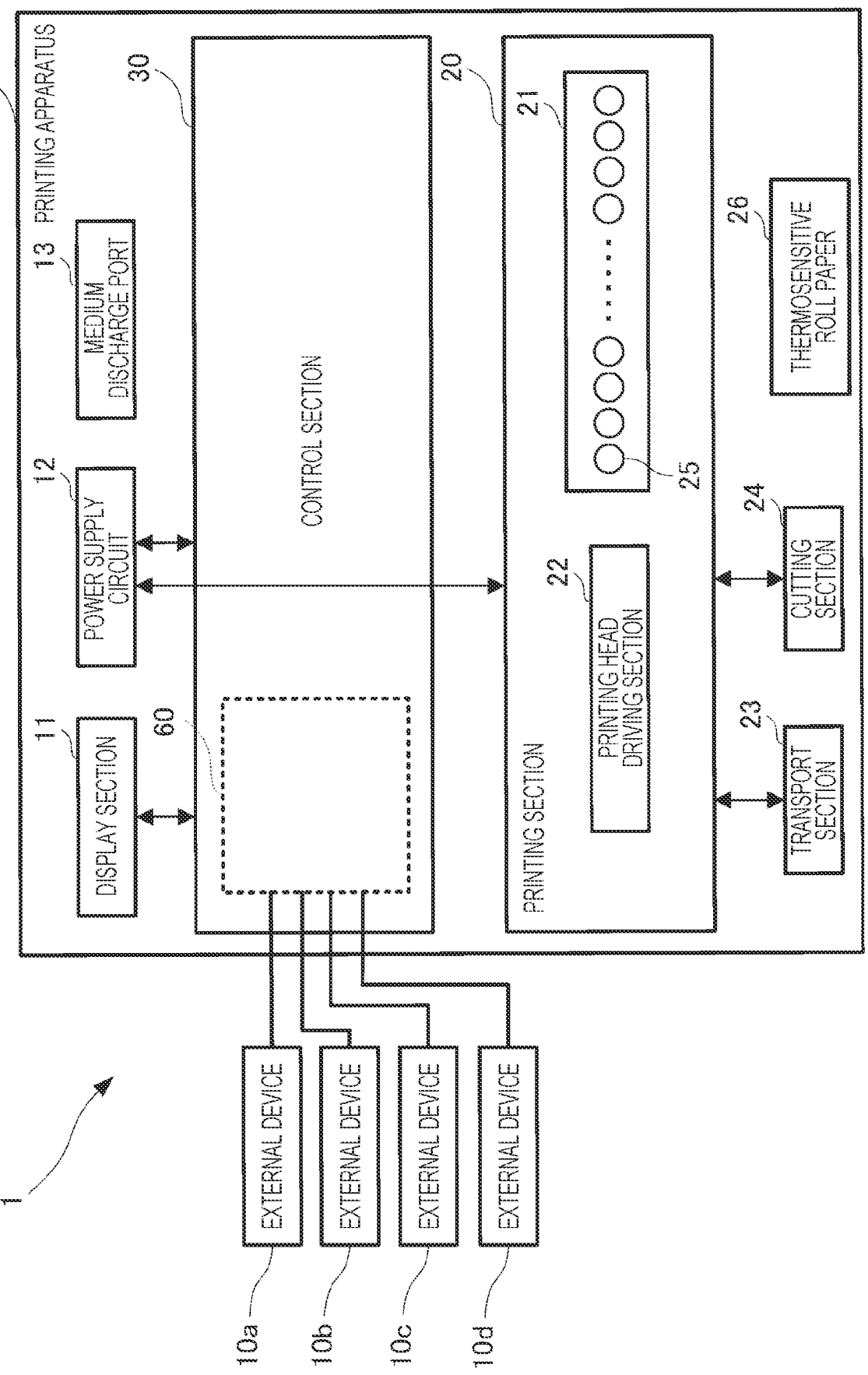
FIG. 2 is a block diagram of the printing system.

The functional configuration of the printing system 1 will be described with reference to FIG. 2. FIG. 2 is a block diagram of the printing system 1.

The printing system 1 includes an external device 10a, an external device 10b, an external device 10c, an external device 10d, and the printing apparatus 2. The smart device 3a, the customer display 3b, and the handy scanner 3c described above are examples of the external device 10a, the external device 10b, the external device 10c, and the external device 10d.

The printing apparatus 2 includes a display section 11, a power supply circuit 12, a medium discharge port 13, a printing section 20, and a control section 30.

The display section 11 includes, for example, a plurality of LEDs. The display section 11 is electrically coupled to the control section 30 and is controlled by the control section 30. The display section 11 displays, for example, information related to the state of the printing apparatus 2 by blinking the LED. The display section 11 may be a liquid crystal display device.

The power supply circuit 12 can supply electric power to the display section 11, the printing section 20, and the control section 30. The power supply circuit 12 is coupled to, for example, a commercial AC power source, and can convert the electric power supplied from the commercial AC power source into appropriate electric power and supply the converted electric power to each section.

The power supply circuit 12 includes, for example, a DC-DC converter, a resistance element, a switching element, a transistor, and the like. The power supply circuit 12 can supply electric power to the external device 10a, the external device 10b, the external device 10c, and the external device 10d, which are electrically coupled to the printing apparatus 2 via the USB interface 60. For example, the power supply circuit 12 can supply electric power to the smart device 3a, the customer display 3b, and the handy scanner 3c.

The printing section 20 includes the thermal head 21 and a printing head driving section 22. Further, the printing section 20 is electrically coupled to the transport section 23 and the cutting section 24. The transport section 23 has a transport roller (not illustrated), and the cutting section 24 has a cutter including a first blade and a second blade. The first blade is a movable blade that moves between the standby position and the cutting position, and the second blade is a fixed blade that engages with the first blade that moves to the cutting position to cut the recording paper. The printing section 20 is electrically coupled to the power supply circuit 12 and operates by receiving electric power supplied from the power supply circuit 12. Further, the printing section 20 is controlled by the control section 30. Further, the printing section 20 executes printing on the medium P based on the print data output from the smart device 3a, which is an example of the external device, for example. As described above, an example of an electronic device including the printing section 20 that performs printing on the medium P is the printing apparatus 2.

The thermal head 21 has a large number of heat generating elements 25. A large number of heat generating elements 25 are arranged in a direction orthogonal to the transport direction of thermosensitive roll paper 26 which is the medium P. The heat generating element 25 is energized to apply heat to the printed surface of the thermosensitive roll paper 26. Accordingly, the thermal head 21 can print letters, images, and the like on the thermosensitive roll paper 26. The part drawn out from the thermosensitive roll paper 26 may be described as recording paper. Further, the printing section 20 is not limited to printing by the thermal head 21, and may perform printing by an ink jet method, an impact dot matrix method, or a laser method. The medium P is not limited to the thermosensitive roll paper 26, but may be a sheet paper, a label paper, or the like.

The printing head driving section 22 is controlled by the control section 30 to control the energization of the thermal head 21 to the heat generating element 25. The transport section 23 is controlled by the control section 30 to rotate the transport roller to transport the thermosensitive roll paper 26. The cutting section 24 is controlled by the control section 30 and drives the first blade to slide toward the second blade to cut the thermosensitive roll paper 26.

Figure 3:
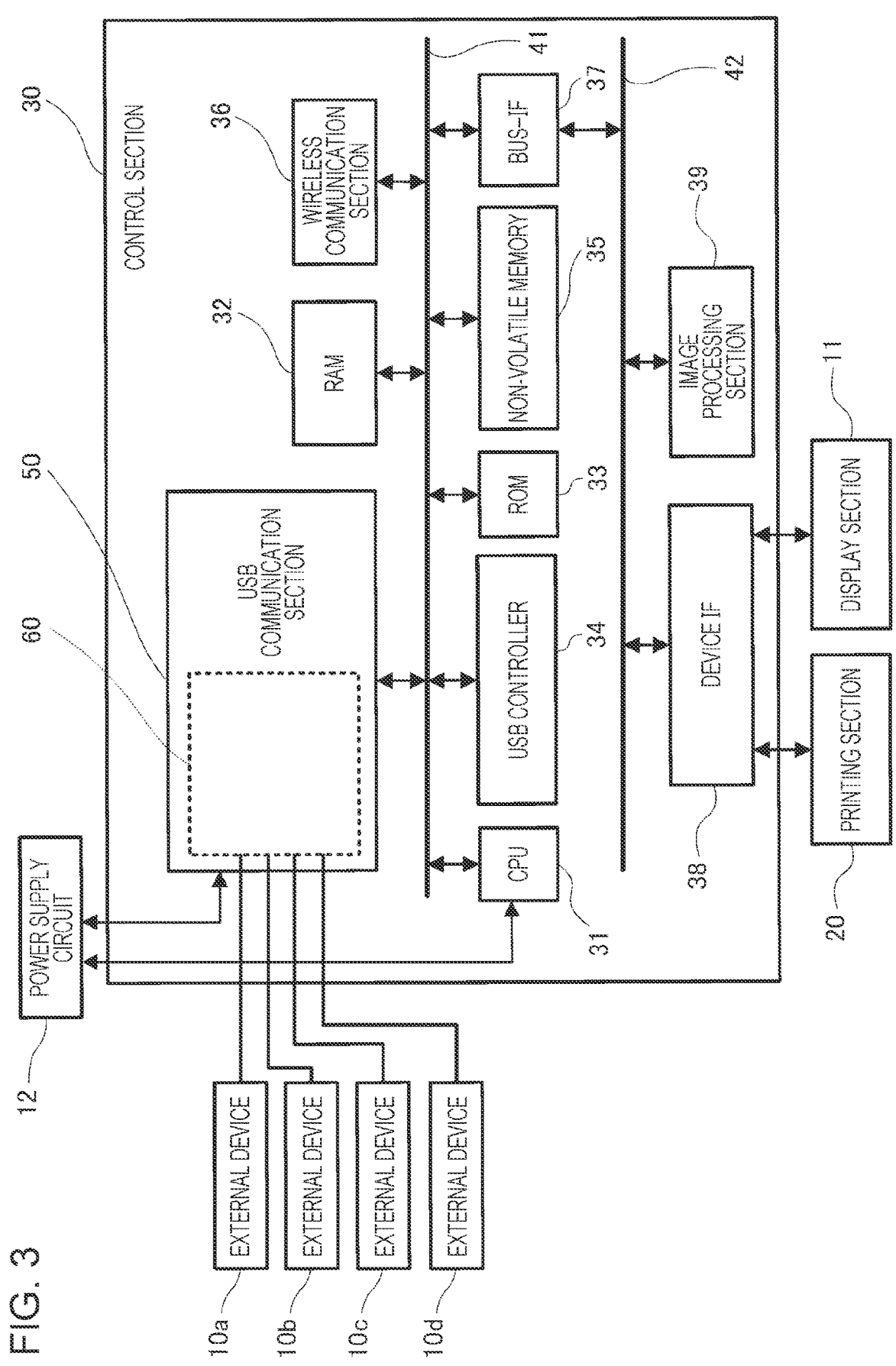
FIG. 3 is a block diagram of a control section of a printing apparatus.

FIG. 3 is a block diagram of the control section 30 of the printing apparatus 2. As illustrated in FIG. 3, the control section 30 includes a central processing unit (CPU) 31, a random access memory (RAM) 32, a read only memory (ROM) 33, a USB controller 34, a non-volatile memory 35, a wireless communication section 36, a USB communication section 50, a BUS-IF 37, a device IF 38, and an image processing section 39. The CPU 31 is an example of a control circuit. Although the CPU is exemplified as an example of the control circuit, the control circuit may be configured to include hardware such as field programmable gate array (FPGA) in place of the CPU or in addition to the CPU.

The CPU 31 performs the main control of the printing apparatus 2. The CPU 31 is electrically coupled to the RAM 32, the ROM 33, the USB controller 34, the non-volatile memory 35, the wireless communication section 36, the USB communication section 50, and the BUS-IF 37 via a system bus 41.

The RAM 32 is a memory that can be read and written at any time to provide a work area of the CPU 31. The RAM 32 can also be used as an image memory for temporarily storing image data. The ROM 33 is a boot ROM and stores a boot program of the system. The non-volatile memory 35 stores system software, set value data, and the like that need to be retained even after the power supply of the printing apparatus 2 is cut off.

The USB controller 34 controls the USB interface 60 via the system bus 41. In other words, the USB controller 34 controls the external device 10a, the external device 10b, the external device 10c, and the external device 10d, which are coupled to the USB interface 60. For example, the USB controller 34 may be configured to include hardware such as a system on a chip (SoC).

Figure 4:
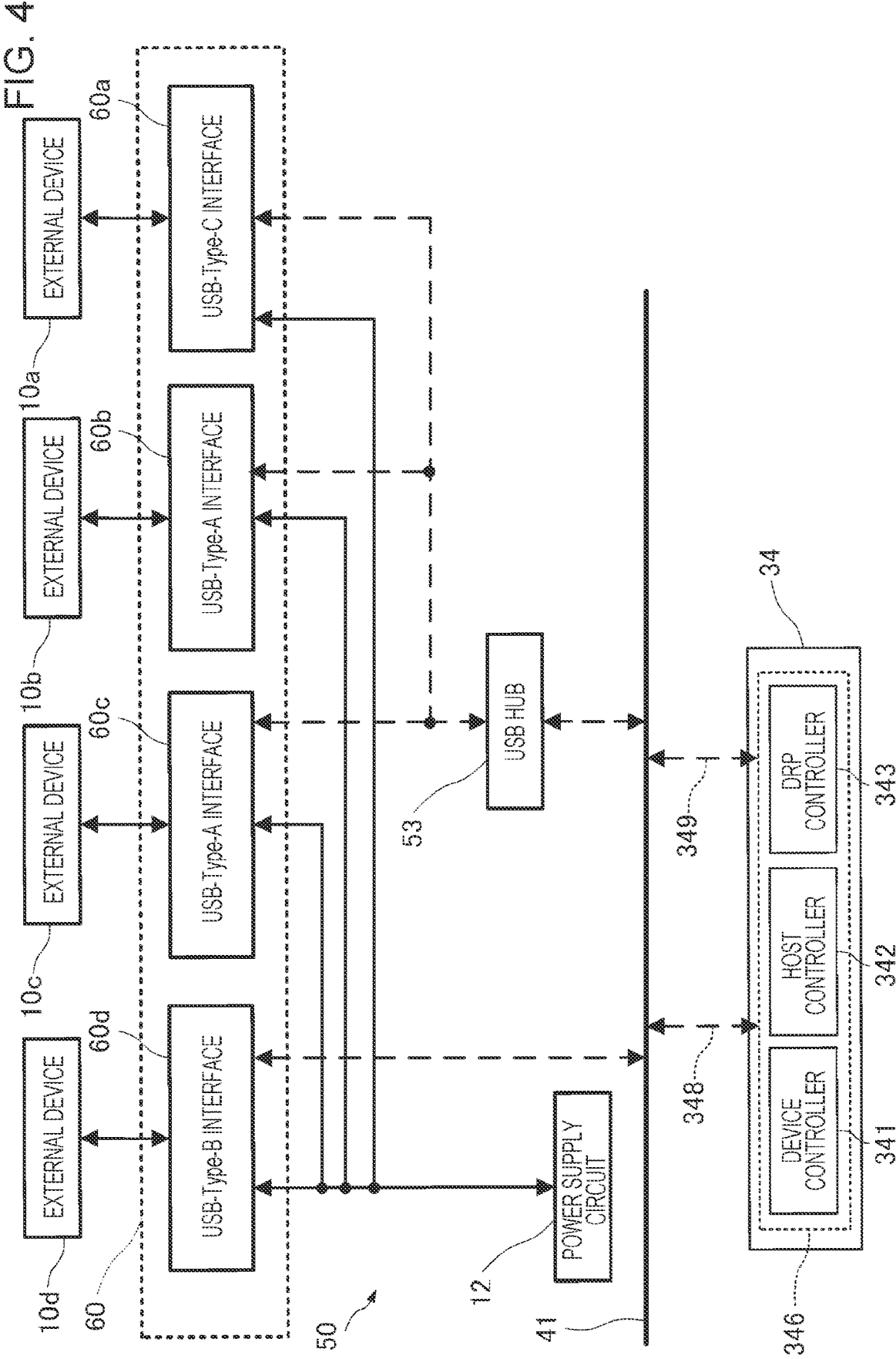
FIG. 4 is a block diagram of a USB controller and a USB interface.

As an example of the hardware configuration of the USB controller 34, FIG. 4 shows a configuration example in which the USB controller 34 includes an integrated circuit 346. In this integrated circuit 346, electric signals from the external devices 10a, 10b, and 10c are input via a signal path 349, and electric signals from the external device 10d are input via a signal path 348. Then, the integrated circuit 346 generates a control signal based on the electric signal input via the signal paths 348 and 349, and transmits the control signal to the CPU 31 via the system bus 41. The CPU 31 controls the state of the printing apparatus 2 in response to this control signal. Specifically, the printing apparatus 2 is in the state of either the host or the device.

The electric signal transmitted via the signal path 348 is an electric signal from the external device 10*d* transmitted via a USB-Type-B interface 60*d*. Generally, the external device 10*d* functions as a host. On the other hand, the electric signal transmitted via the signal path 349 is an electric signal from the external device 10*a* transmitted via a USB-Type-C interface 60*a*. Generally, the external device 10*a* functions as either a host or a device. Similarly, the electric signal transmitted via the signal path 349 is an electric signal transmitted via USB-Type-A interfaces 60*b* and 60*c*. Generally, the external devices 10*b* and 10*c* function as hosts.

For example, the electric signal transmitted via the signal path 349 may be an electric signal from the external device 10*a* that functions as a host or a device and an electric signal from the external devices 10*b* and 10*c* that function as hosts. Further, the electric signal transmitted via the signal path 348 may be an electric signal from the external device 10*d* that functions as a host. As described above, the signal path of the electric signal may be separated according to the state of the host or the device of the external device coupled to the USB interface 60. The various controllers included in the USB controller 34 will be described later.

The wireless communication section 36 can be coupled to an external device by using wireless communication. The wireless communication section 36 can communicate with an external device according to a standard such as Wi-Fi (registered trademark) or Bluetooth (registered trademark). The BUS-IF 37 is an interface that electrically couples the system bus 41 and an image bus 42. The BUS-IF 37 can operate as a bus bridge that converts the data structure.

In addition to the BUS-IF 37, the device IF 38 and the image processing section 39 are electrically coupled to the image bus 42. The device IF 38 is an interface that couples the control section 30, the printing section 20, and the display section 11. The device IF 38 can perform data synchronous and asynchronous conversion. The image processing section 39 can execute predetermined processing on the data related to printing output to the printing section 20.

1-3. USB Interface

FIG. 4 is a block diagram of the USB communication section 50 and the USB interface 60. FIGS. 5 to 8 are views illustrating each interface included in the USB interface 60. As illustrated in FIG. 4, the USB communication section 50 includes the USB interface 60 and a USB hub 53.

The USB hub 53 is electrically coupled to the USB interface 60. Further, the USB hub 53 receives an instruction from the USB controller 34 via the system bus 41 and operates between the USB controller 34 and the USB interface 60. For example, the USB hub 53 may be configured to include hardware such as an integrated circuit. Further, the USB hub 53 serves as a line concentrator or a relay device in the USB network.

Further, the USB interface 60 includes the USB-Type-C interface 60*a*, the USB-Type-A interfaces 60*b* and 60*c*, and the USB-Type-B interface 60*d*.

In FIG. 4, an example in which the USB-Type-C interface 60*a* is coupled to the external device 10*a*, the USB-Type-A interface 60*b* is coupled to the external device 10*b*, the USB-Type-A interface 60*c* is coupled to the external device 10*c*, and the USB-Type-B interface 60*d* is coupled to the external device 10*d* is illustrated, but the present disclosure is not limited thereto. The USB interface 60 may include a USB interface of another standard such as mini-USB-Type-A or micro-USB-Type-A.

The power supply circuit 12 illustrated in FIG. 3 supplies electric power to the USB-Type-C interface 60*a*, the USB-Type-A interfaces 60*b* and 60*c*, and the USB-Type-B interface 60*d*. The power supply circuit 12 may be configured to supply electric power to the USB hub 53. Further, the power supply circuit 12 may be configured not to supply electric power to the USB-Type-B interface 60*d*.

The USB communication section 50 may be configured to include a PD controller. The PD controller performs a control to supply electric power corresponding to the USB power delivery (PD) standard to the external device 10*a* coupled to the USB-Type-C interface 60*a*. The power supply circuit 12 may be configured to supply electric power to the USB-Type-C interface 60*a*, or a power supply circuit different from the power supply circuit 12 may be configured to supply electric power to the USB-Type-C interface 60*a*. In any case, the electric power corresponding to the USB PD standard may be supplied to the USB-Type-C interface 60*a*.

For example, a power supply circuit that supplies electric power corresponding to the USB PD standard to the USB-Type-C interface 60*a* generates voltages different from 5 V, 9 V, and 12 V, and supplies a plurality of different voltages to the external device 10*a*. In addition, the power supply circuit may be configured to supply a constant current regardless of the voltage supplied to the external device 10*a*, or may be configured to supply a different current depending on the supplied voltage.

Figure 5:
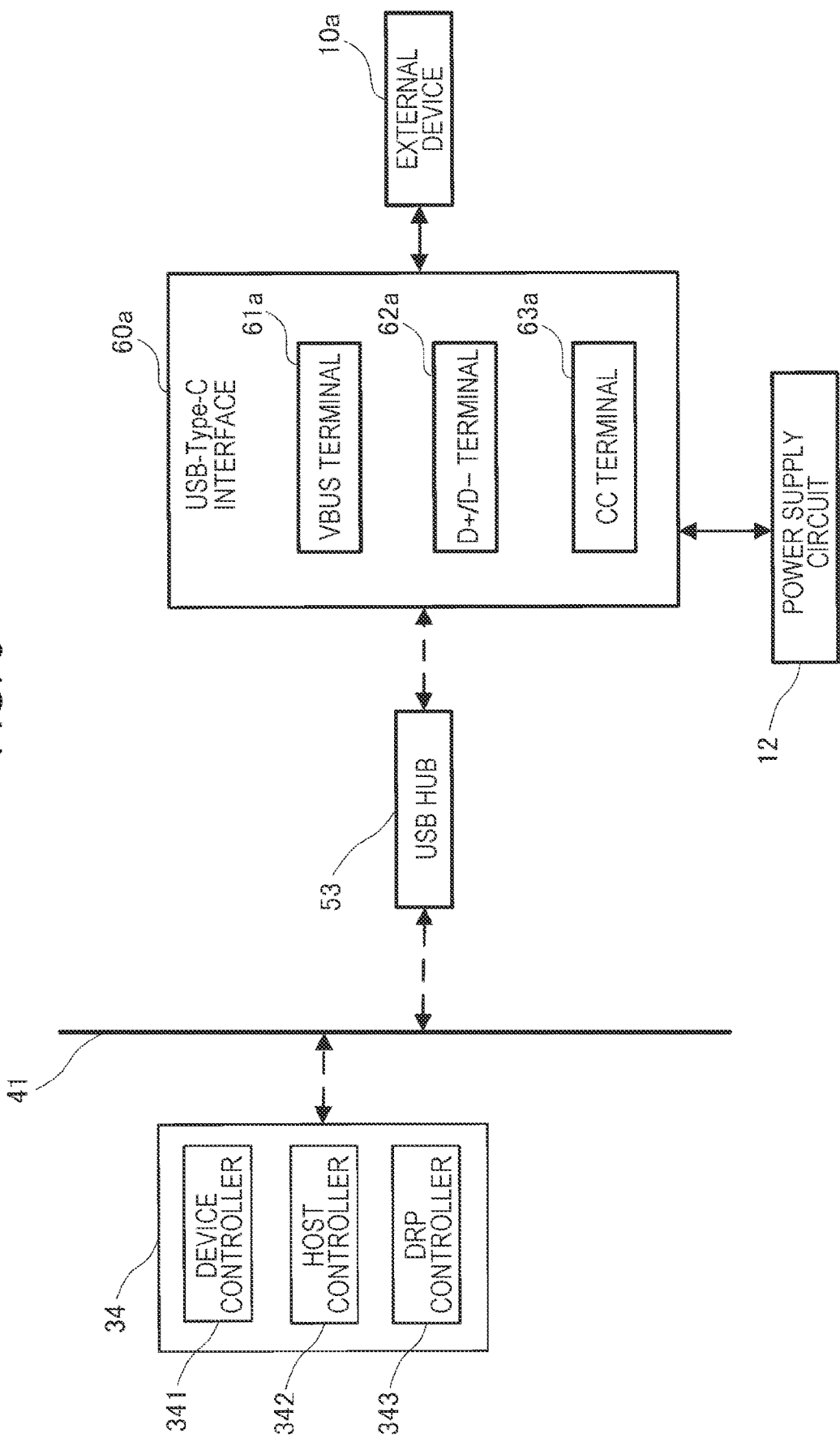
FIG. 5 is a block diagram of the USB controller and a USB-Type-C interface.

The USB-Type-C interface 60*a* will be described with reference to FIG. 5. FIG. 5 is a block diagram of the USB controller 34 and the USB-Type-C interface 60*a*.

The USB controller 34 includes a device controller 341, a host controller 342, and a dual role port (DRP) controller 343. The USB-Type-C interface 60*a* is controlled by the DRP controller 343 of the USB controller 34 via the system bus 41 and the USB hub 53.

The USB-Type-C interface 60*a* includes a VBUS terminal 61*a*, a D+/D− terminal 62*a*, and a configuration channel (CC) terminal 63*a*.

The DRP controller 343 controls data transmission/reception from the external device 10*a* coupled to the USB-Type-C interface 60*a*. The DRP controller 343 performs the data transmission control for transmitting data such as commands related to printing to the CPU 31 via the system bus 41.

The DRP controller 343 mediates mutual communication performed between the USB controller 34 and the USB interface 60, for example, in synchronous serial communication or the like. The synchronous serial communication may be, for example, inter-integrated circuit (I2C) communication.

The VBUS terminal 61*a* is a so-called power input/output terminal. The VBUS terminal 61*a* is a terminal for transmitting and receiving electric power to and from the external device 10*a*. Therefore, electric power can be received between the printing apparatus 2 and the external device 10*a*.

The port that supplies electric power is a source, and the port that receives electric power is a sink. The device that functions as a source is a provider, and the device that functions as a sink is a consumer. The USB-Type-C interface 60*a* can change the supply or reception of electric power depending on the situation. For example, when the printing apparatus 2 is a source, the external device 10a coupled to the USB-Type-C interface 60a is a sink. In addition, when the printing apparatus 2 is a sink, the external device 10a coupled to the USB-Type-C interface 60a is a source.

The D+/D− terminal 62a is a so-called data transmission/reception terminal. The D+/D− terminal 62a is a terminal for transmitting and receiving a data signal to and from the external device 10a. Therefore, data signals can be transmitted and received between the printing apparatus 2 and the external device 10a.

The CC terminal 63a is a so-called state identification terminal. The CC terminal 63a is a terminal that identifies whether the D+/D− terminal 62a is in a state where the data signal can be received from the external device 10a or is in a state where the data signal can be transmitted to the external device 10a. For example, the CC terminal 63a is a terminal that identifies whether the VBUS terminal 61a is in a state where electric power can be supplied from the external device 10a or is in a state where electric power can be supplied to the external device 10a. Therefore, the USB controller 34 can identify the state of the external device 10a.

When the external device 10a is not coupled to the USB-Type-C interface 60a, the CC terminal 63a alternately switches between a first potential E1 and a second potential E2 at regular intervals during a unit time. When the external device 10a is coupled to the USB-Type-C interface 60a, the potential of the CC terminal 63a is fixed. For example, the potential of the CC terminal 63a may be fixed to the first potential E1 when the external device 10a functions as a host, and may be fixed to the second potential E2 when the external device 10a functions as a device, and vice versa.

Figure 6:
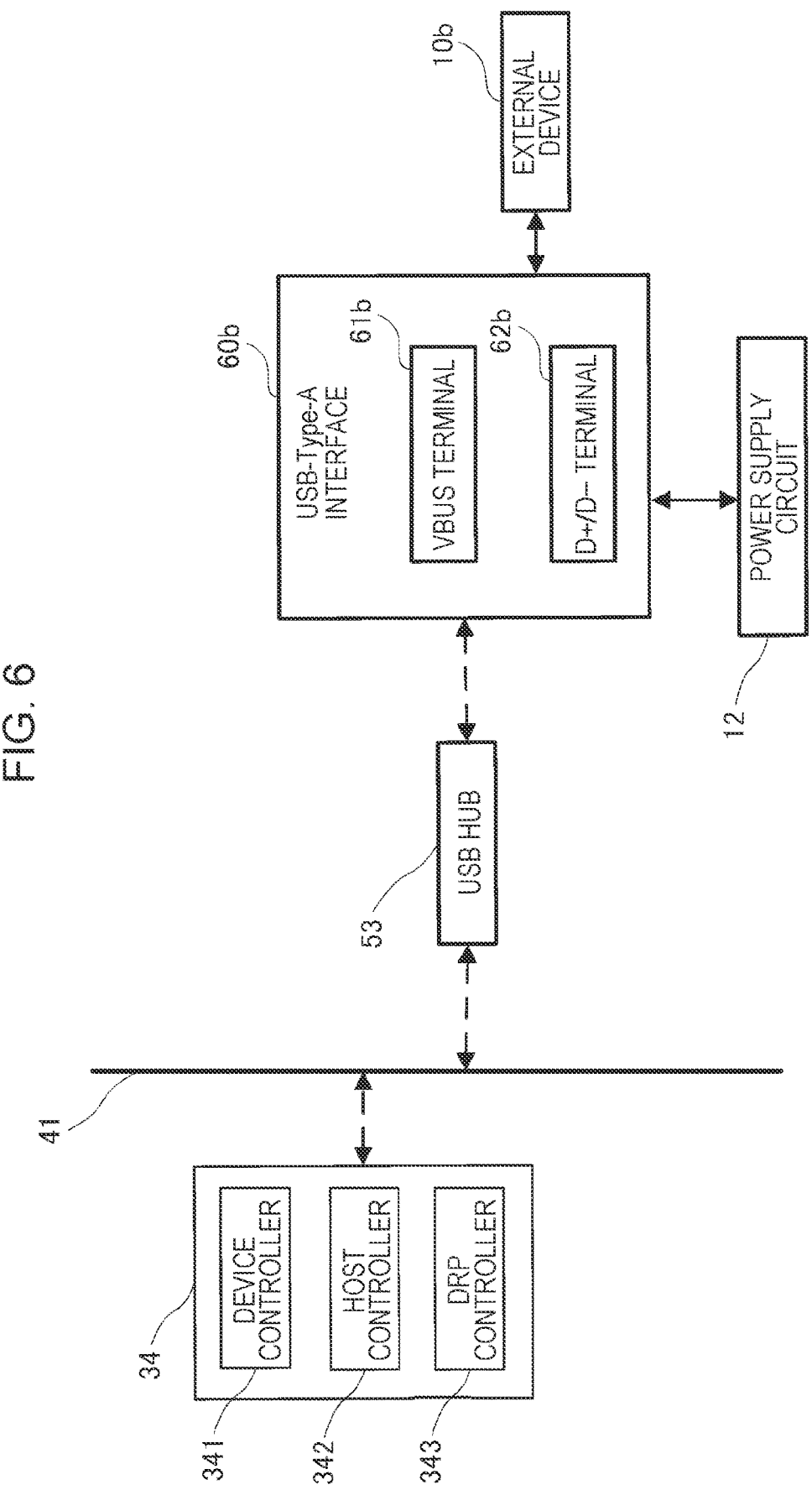
FIG. 6 is a block diagram of the USB controller and a USB-Type-A interface.

Next, the USB-Type-A interface 60b will be described with reference to FIG. 6. FIG. 6 is a block diagram of the USB controller 34 and the USB-Type-A interface 60b.

The USB-Type-A interface 60b includes a VBUS terminal 61b and a D+/D− terminal 62b. Unlike the above-described USB-Type-C interface 60a, the CC terminal 63a is omitted. Therefore, the USB-Type-A interface 60b does not have a function of identifying the state of the coupled external device 10b.

The USB-Type-A interface 60b is supplied with electric power from the power supply circuit 12, and supplies electric power to the external device 10b via the VBUS terminal 61b. For example, the voltage supplied to the USB-Type-A interface 60b by the power supply circuit 12 is 5 V. Further, the USB-Type-A interface 60b transmits a signal to the external device 10b via the D+/D− terminal 62b. The external device 10b generally functions as a host.

The USB hub 53 electrically coupled to the USB-Type-A interface 60b is controlled by the host controller 342 of the USB controller 34 via the system bus 41. In other words, the USB-Type-A interface 60b is controlled by the host controller 342.

Figure 7:
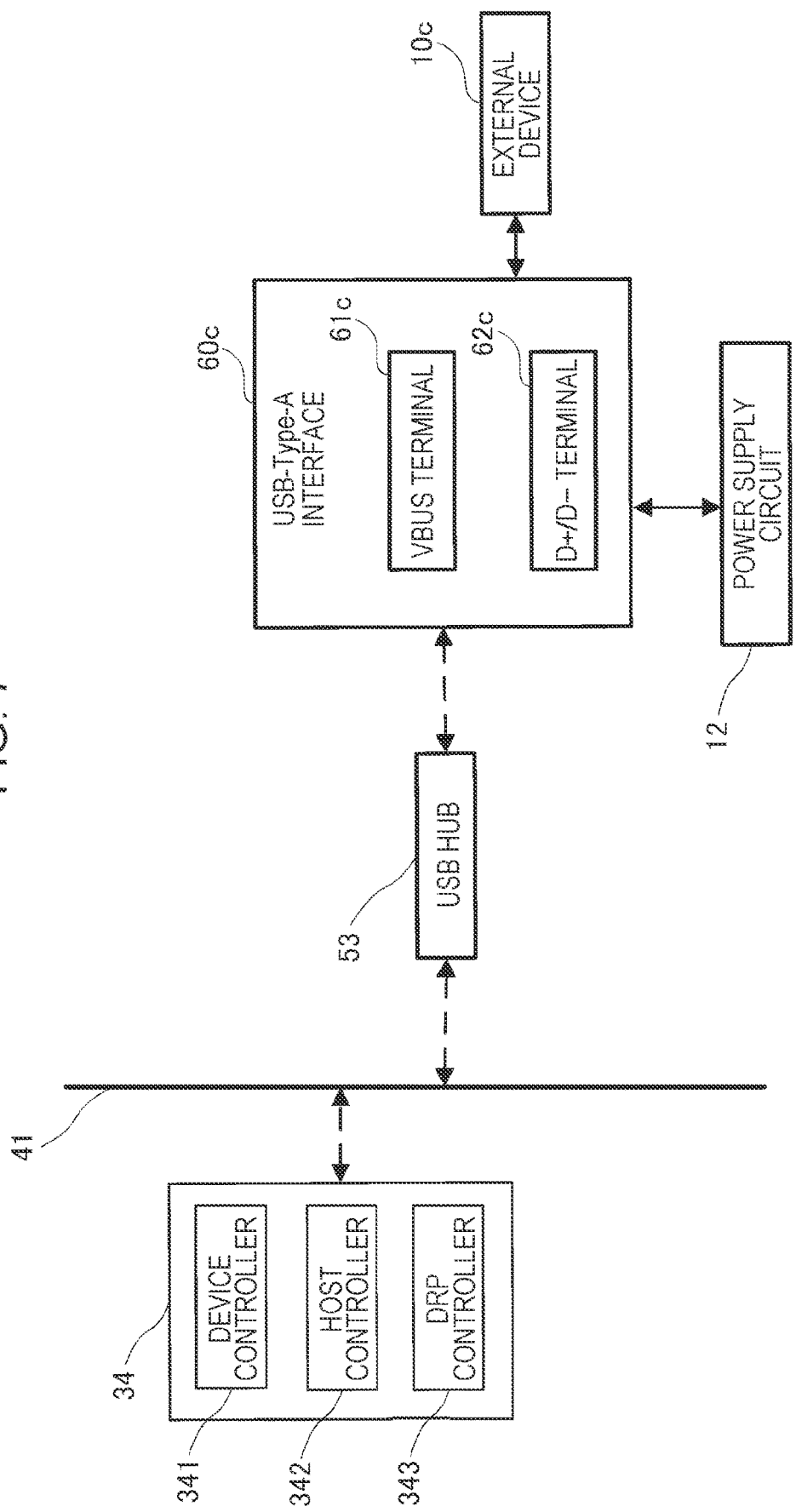
FIG. 7 is a block diagram of the USB controller and the USB-Type-A interface.

Since the USB-Type-A interface 60c illustrated in FIG. 7 has the same configuration as the USB-Type-A interface 60b illustrated in FIG. 6, the description thereof will be omitted.

Figure 8:
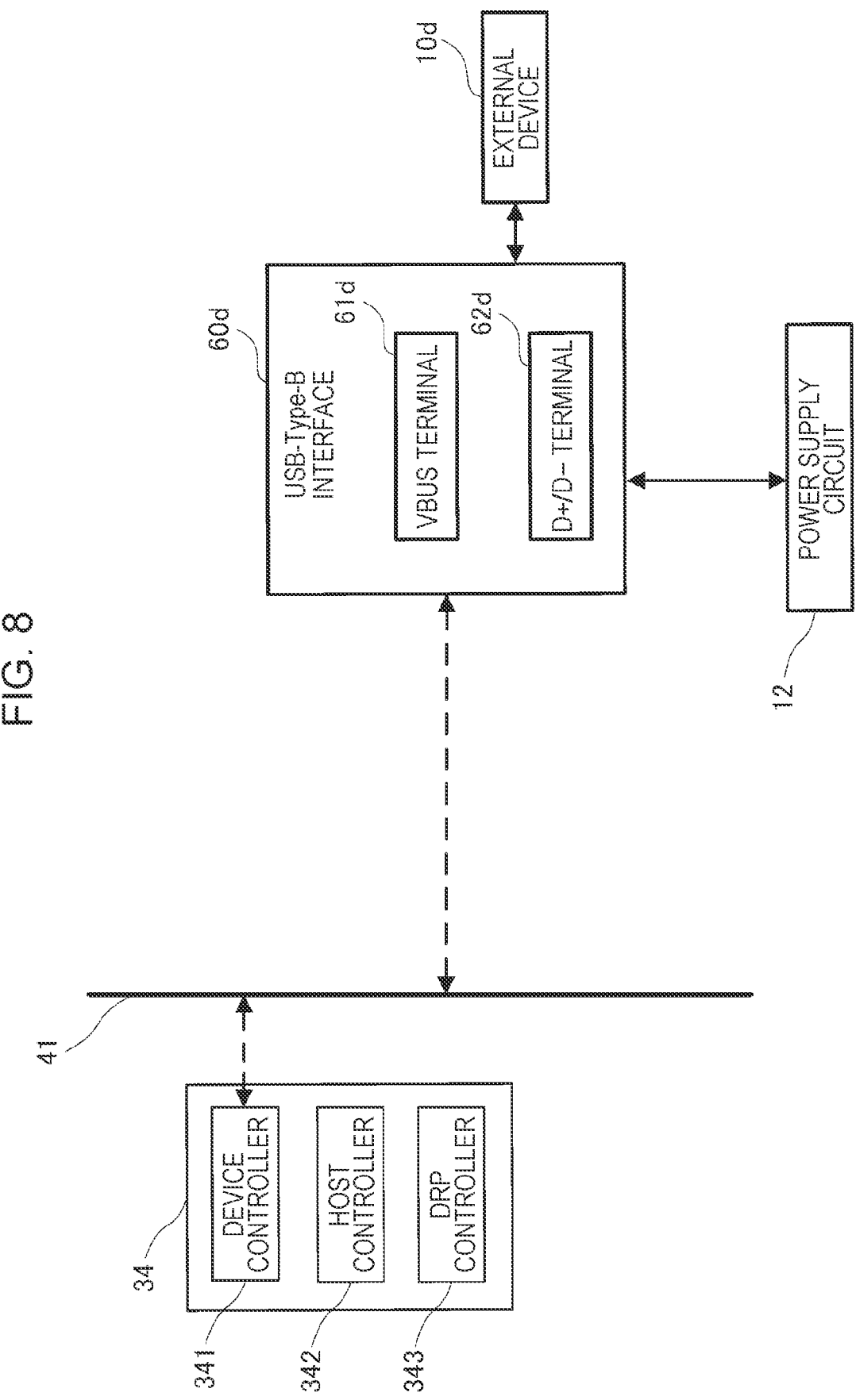
FIG. 8 is a block diagram of the USB controller and a USB-Type-B interface.

Next, the USB-Type-B interface 60d will be described with reference to FIG. 8. FIG. 8 is a block diagram of the USB controller 34 and the USB-Type-B interface 60d.

The USB-Type-B interface 60d includes a VBUS terminal 61d and a D+/D− terminal 62d. Unlike the above-described USB-Type-C interface 60a, the CC terminal 63a is omitted. Therefore, the USB-Type-B interface 60d does not have a function of identifying the state of the coupled external device 10d.

The USB-Type-B interface 60d is supplied with electric power from the power supply circuit 12, and supplies electric power to the external device 10d via the VBUS terminal 61d. For example, the voltage supplied to the USB-Type-B interface 60d by the power supply circuit 12 is 5 V. Further, the USB-Type-B interface 60d transmits a signal to the external device 10d via the D+/D− terminal 62d. The external device 10d generally functions as a host.

The USB-Type-B interface 60d is controlled by the device controller 341 of the USB controller 34 via the system bus 41.

In other words, unlike the USB-Type-A interfaces 60b and 60c, the USB-Type-B interface 60d is controlled from the USB controller 34 without going through the USB hub 53. The USB-Type-B interface 60d may be configured to be controlled from the USB controller 34 via the USB hub 53.

1-4. Printing Apparatus

A schematic configuration of the printing apparatus 2 will be described with reference to FIGS. 9 to 11.

Figure 9:
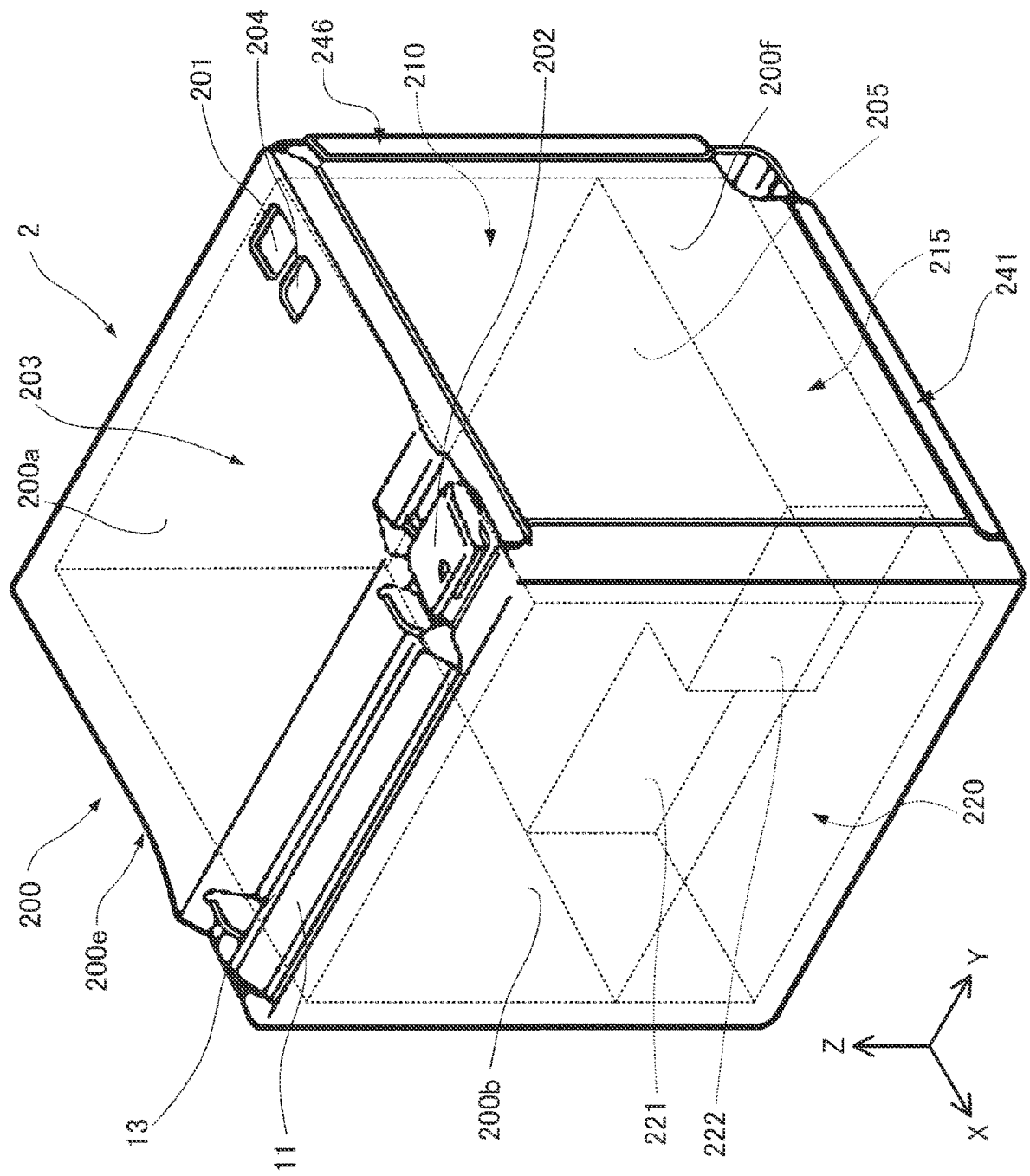
FIG. 9 is a perspective view of the printing apparatus.
Figure 10:
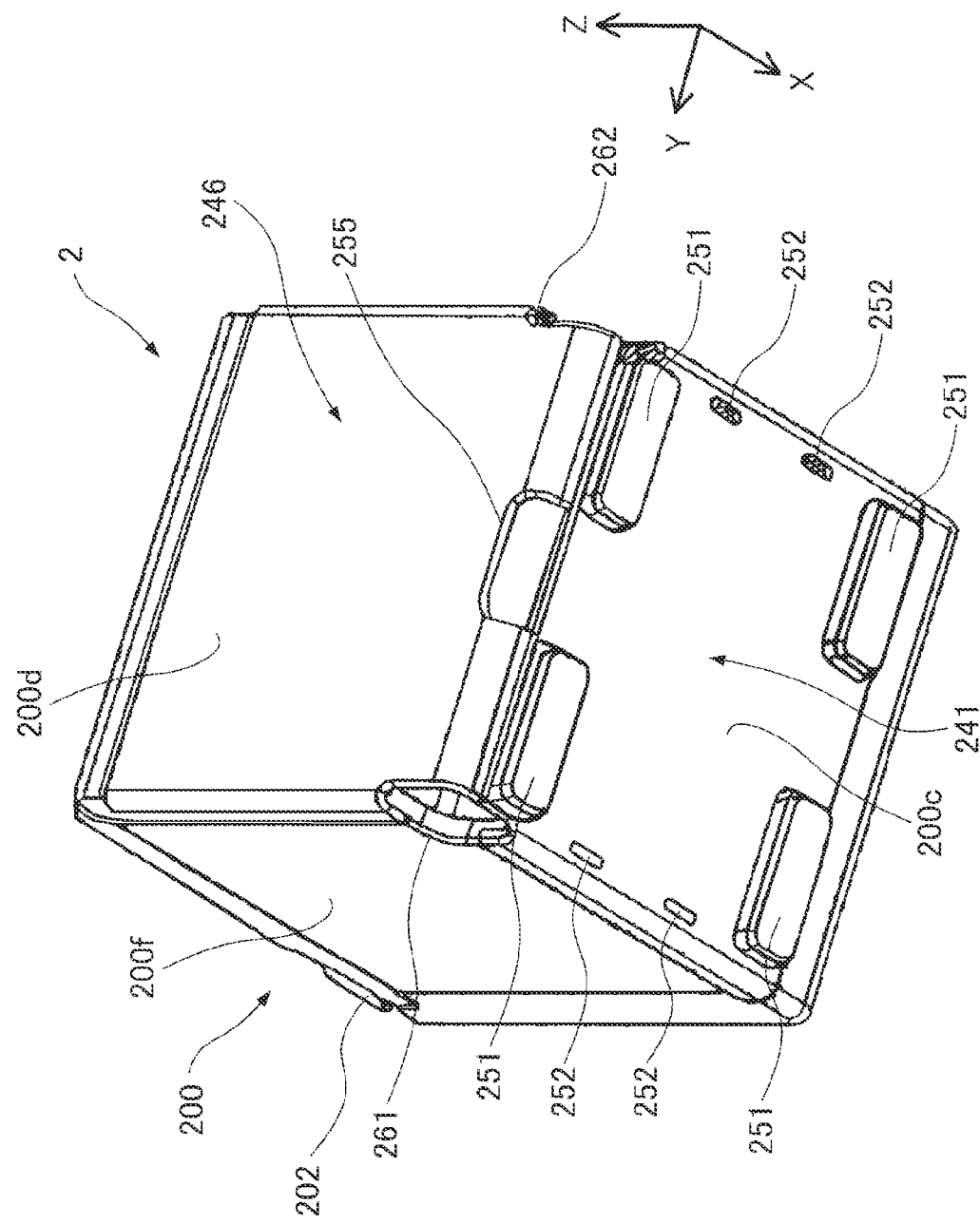
FIG. 10 is a perspective view of the printing apparatus when viewed from the back.
Figure 11:
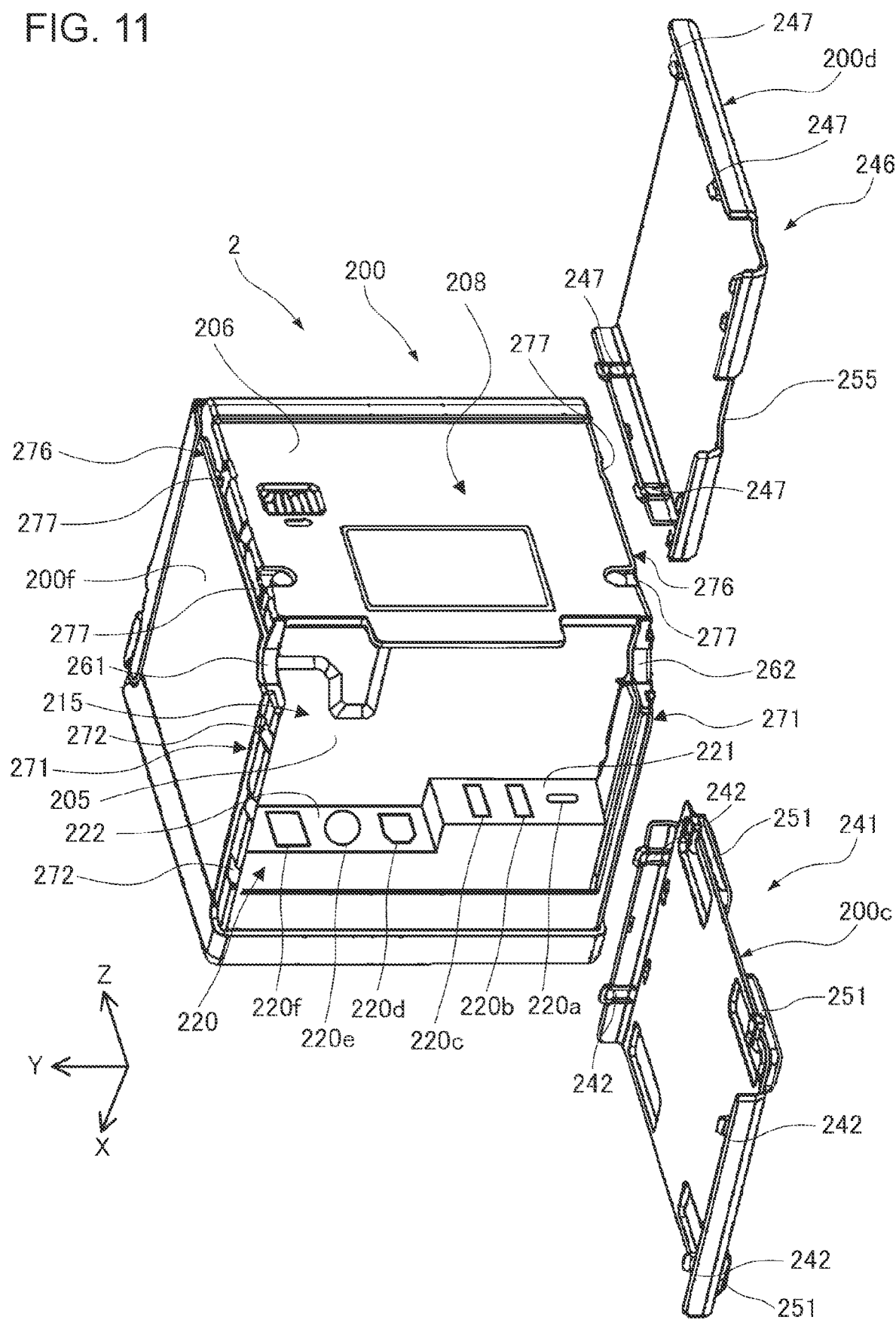
FIG. 11 is a perspective view of the printing apparatus from which a bottom cover and a back cover are removed.

In FIGS. 9 to 11, the +X direction is the front direction of the printing apparatus 2, the −X direction is the rear direction of the printing apparatus 2, the +Y direction is the right direction of the printing apparatus 2, the −Y direction is the left direction of the printing apparatus 2, the +Z direction is the upward direction of the printing apparatus 2, and the −Z direction is the downward direction of the printing apparatus 2.

The printing apparatus 2 is, for example, a thermal printer. As illustrated in FIG. 9, the printing apparatus 2 has a main body case 200 having a rectangular parallelepiped shape as a whole, excluding uneven portions such as buttons. As illustrated in FIG. 11, a bottom cover 241 and a back cover 246 of the printing apparatus 2 are attachable and detachable, and the main body frame 208 is covered with the bottom cover 241 and the back cover 246.

Inside the main body case 200, a printing section 20 illustrated in FIG. 2, a medium storage section 210 for storing the medium P, and a connector section 220 are provided. When the opening/closing door 203 is closed, the printed medium P is discharged from the medium discharge port 13 via a transport path formed between the opening/closing door 203 and the main body case 200.

The opening/closing door 203 constitutes the first case surface 200a of the main body case 200, and is coupled to be openable/closable behind the main body case 200. In FIG. 9, the first case surface 200a is the front surface of the main body case 200. The opening/closing door 203 is provided with, for example, a transport roller at the front end portion, and the transport roller is arranged to face the thermal head 21 provided in the main body case 200 when the opening/closing door 203 is closed. When the opening/closing door 203 is closed, the transport roller and the thermal head 21 are in a state of sandwiching the medium P, the medium P is transported by the rotation of the transport roller, and printing is performed on the printed surface of the medium P by the thermal head 21. The display section 11, the medium discharge port 13, a power switch 201, an opening/closing lever 202, and a feed switch 204 are provided on the first case surface 200a of the main body case 200. In other words, the display section 11, the medium discharge port 13, the power switch 201, the opening/closing lever 202, and the feed switch 204 are arranged on the first case surface 200a of the main body case 200.

Further, the connector section 220 is provided on a routing section 215 formed between a third case surface 200c and a first main body frame surface 205, facing a third case surface 200c of the main body case 200. In FIG. 9, the third case surface 200c is the bottom surface of the main body case 200. As will be described later, the connector section 220 includes a substrate 300 provided with various receptacle connectors. The substrate 300 is parallel to the third case surface 200c of the main body case 200. For example, the substrate 300 is coupled to the main substrate accommodated inside the main body case 200 and is arranged to be parallel to the third case surface 200c of the main body case 200.

The power switch 201 is a switch for turning on or off the power of the printing apparatus 2. As illustrated in FIG. 1, the printing apparatus 2 is coupled to a commercial AC power source via the power cable 5 and is supplied with electric power. The printing apparatus 2 performs printing on the medium P and communicates with an external device such as the smart device 3a while the power is on.

The opening/closing lever 202 is for opening and closing the opening/closing door 203. The user operates the opening/closing lever 202 to open the opening/closing door 203, and stores the thermosensitive roll paper 26, which is the medium P, in the medium storage section 210 provided in the main body case 200. The opening/closing door 203 seals the medium storage section 210 from above.

The feed switch 204 is a switch for feeding the thermosensitive roll paper 26 which is the medium P stored in the medium storage section 210. Specifically, the user can feed the thermosensitive roll paper 26 to a desired position by operating the feed switch 204. For example, the roll paper may be transported when the user is pressing the feed switch 204, and the transport of the roll paper may be stopped while the user is not pressing the feed switch 204.

The display section 11 may display, for example, information related to the communication state, information for prompting the replenishment of the medium P, and the like. Since the display section 11 has a role of notifying the user of the state of the printing apparatus 2, it is preferable that the display section 11 be provided at a position where the user easily visually recognizes the display section 11. For example, when the printing apparatus 2 is arranged such that a second case surface 200b of the main body case 200 faces the front surface, the user can easily visually recognize the display section 11 and the medium discharge port 13.

The medium discharge port 13 discharges, for example, the medium P on which letters, images, and the like are printed based on print data. As described above, for example, when the user is in the front direction of the printing apparatus 2 and the printing apparatus 2 is arranged such that the second case surface 200b of the main body case 200 faces the front surface, the printed surface of the medium P faces the user, and thus the user can confirm the content printed on the medium P while observing how the medium P is discharged from the medium discharge port 13. Therefore, the user can confirm the printed contents without waiting for the completion of the discharge of the medium P from the medium discharge port 13.

Therefore, it is preferable that the medium discharge port 13 be provided at a position where the user can easily visually recognize the medium discharge port 13, similarly to the display section 11. Furthermore, it is more preferable that the medium discharge port 13 be provided near the display section 11 such that the user can visually recognize the medium discharge port 13 at the same time as the display section 11. Specifically, it is preferable that the medium discharge port 13 and the display section 11 be provided side by side on the first case surface 200a of the main body case 200, and the longitudinal direction of the medium discharge port 13 and the display section 11 be the Y direction which is the width direction of the main body case 200.

As illustrated in FIG. 10, the bottom cover 241 constituting the third case surface 200c of the main body case 200 is attachable and detachable and covers the routing section 215. The bottom cover 241 has a substantially rectangular shape. The bottom cover 241 has a plurality of elastic members 251 that serve as legs of the printing apparatus 2. Further, the bottom cover 241 has a plurality of holes 252. The hole 252 discharges water droplets that have entered the inside of the main body case 200 to the outside of the main body case 200. Further, the printing apparatus 2 can be used by hanging the printing apparatus 2 on a wall in addition to using by placing the printing apparatus 2 on a table, a floor, or the like. At this time, the hole 252 engages with a wall-hanging member (not illustrated), and the printing apparatus 2 is hung on the wall. As a result, the printing apparatus 2 can be used in a so-called wall-hanging state, and the table or floor can be widely used.

As illustrated in FIG. 10, the back cover 246 constituting a fourth case surface 200d of the main body case 200 is attachable and detachable and covers a second main body frame surface 206. In FIG. 9, the fourth case surface 200d is the back surface of the main body case 200. The back cover 246 has a substantially rectangular shape. The back cover 246 covers the main body frame 208 from the back. The back cover 246 has a cable draw-out port 255 for drawing out various cables coupling the printing apparatus 2 and various external devices.

As illustrated in FIG. 11, a fifth case surface 200e and a sixth case surface 200f of the main body case 200 are provided with a first attaching section 271 for mounting the bottom cover 241. In FIG. 9, the fifth case surface 200e is the left side surface of the main body case 200, and the sixth case surface 200f is the right side surface of the main body case 200. Similarly, the fifth case surface 200e and the sixth case surface 200f of the main body case 200 are provided with a second attaching section 276 for mounting the back cover 246.

The first attaching section 271 is formed at the lower end portions of the fifth case surface 200e and the sixth case surface 200f of the main body case 200. The first attaching section 271 is provided with a case-side engaging section 272. The bottom cover 241 is mounted to the main body case 200 by engaging the case-side engaging section 272 and a cover-side engaging section 242 provided on the bottom cover 241.

The second attaching section 276 is formed at the rear end portions of the fifth case surface 200e and the sixth case surface 200f of the main body case 200. The second attaching section 276 is provided with a case-side engaging section 277. The back cover 246 is mounted to the main body case 200 by engaging the case-side engaging section 277 and a cover-side engaging section 247 provided on the back cover 246.

Further, circular notch sections 261 and 262 are provided at the corners where the first attaching section 271 and the second attaching section 276 provided on the fifth case surface 200e and the sixth case surface 200f of the main body case 200 intersect with each other. Further, the notch sections 261 and 262 communicate with the routing section 215.

The routing section 215 is a space between the third case surface 200c of the main body case 200 and the first main body frame surface 205, and further, is a space defined by the fourth case surface 200d, the fifth case surface 200e, the sixth case surface 200f, and the connector section 220 of the main body case 200.

The routing section 215 is defined with reference to the X direction, the Y direction, and the Z direction illustrated in FIGS. 9 to 11. The X direction is defined as a direction from the back cover 246 to the first connector surface 221 and the second connector surface 222 of the connector section 220, the Y direction is defined as a direction from the fifth case surface 200e to the sixth case surface 200f of the main body case 200, and the Z direction is defined as a direction from the bottom cover 241 to the first main body frame surface 205. The first connector surface 221 or the second connector surface 222 is a flat plate surface, and is, for example, sheet metal. The flat plate surface is not limited to a flat plate made of metal such as sheet metal, and may be a flat plate made of resin or the like.

Various cables coupled to the connector section 220 are routed in the routing section 215. Then, various cables coupled to the connector section 220 are drawn out to the outside of the main body case 200 via the notch sections 261 and 262 or the cable draw-out port 255 provided in the back cover 246.

The printing apparatus 2 can be installed in the first posture in which the medium discharge port 13 of the medium P faces upward, or in the second posture in which the medium discharge port 13 of the medium P faces forward. In other words, in the first posture, the printed medium P is discharged from the medium discharge port 13 in the +Z direction, and in the second posture, the printed medium P is discharged from the medium discharge port 13 in the +X direction. Further, in the first posture, the first case surface 200a is the upper surface of the main body case 200, and in the second posture, the first case surface 200a is the front surface of the main body case 200.

Specifically, in the first posture, the connector section 220 is covered with the bottom cover 241 while in the second posture, the connector section 220 is covered with the back cover 246.

In both the first posture and the second posture, a plurality of elastic members 251 serving as legs of the printing apparatus 2 are arranged on the bottom surface of the printing apparatus 2, and thus the printing apparatus 2 can be stably installed. Further, since the plurality of elastic members 251 are not arranged on the back surface of the printing apparatus 2, the appearance of the printing apparatus 2 does not deteriorate. In a simpler configuration, only one of the bottom cover 241 and the back cover 246 that covers the connector section 220 may be attachable and detachable, and the other cover may be integrated with the main body case 200. In this case, in the first posture, the cover covering the connector section 220 is the bottom surface, and in the second posture, the cover covering the connector section 220 is the back surface.

1-5. Connector Section

Figure 12:
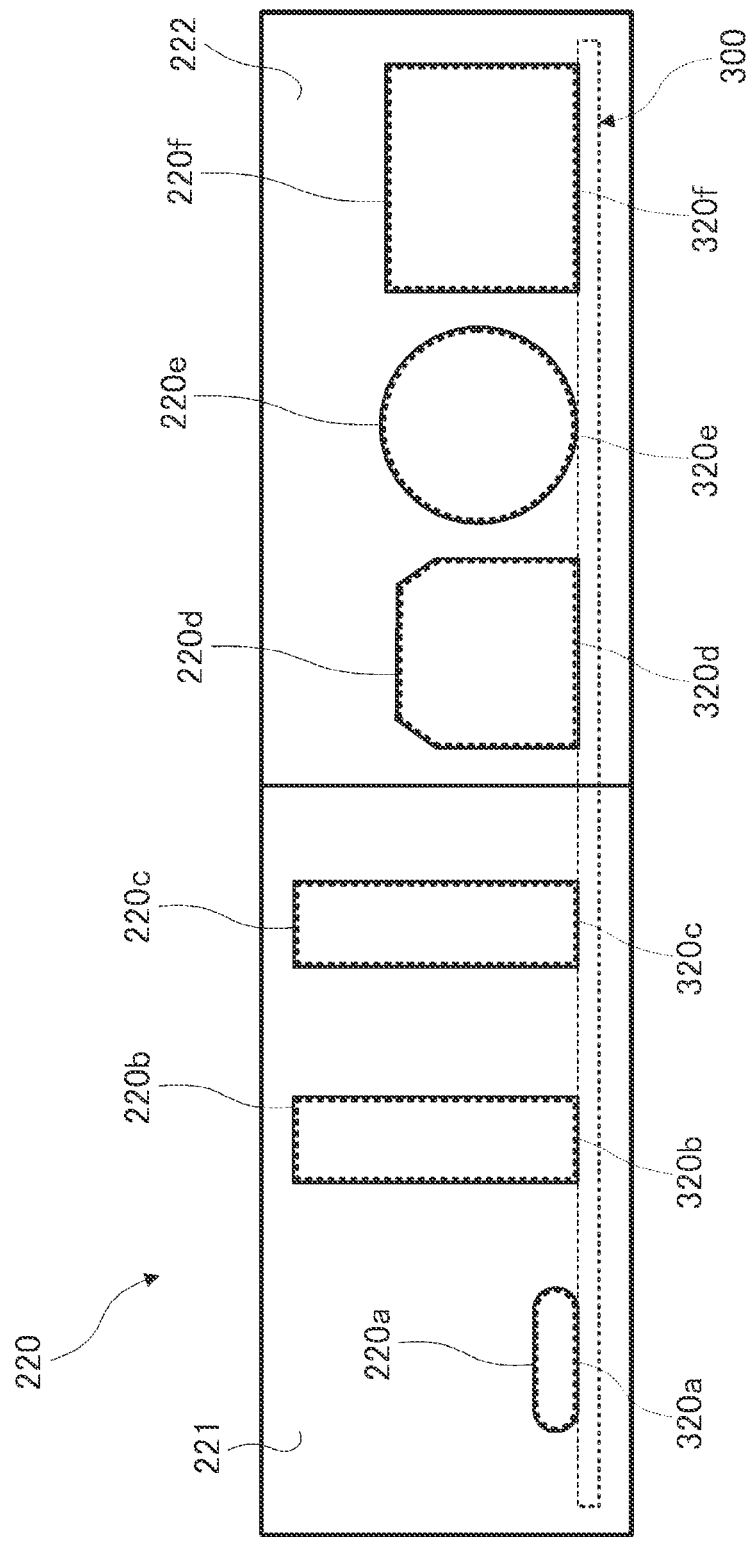
FIG. 12 is a plan view of a first connector surface and a second connector surface.

As illustrated in FIG. 12, the connector section 220 has the first connector surface 221 and the second connector surface 222. The connector section 220 having the first connector surface 221 and the second connector surface 222 is formed of a flat plate, and the outer surface and the inner surface of the first connector surface 221 and the second connector surface 222 are formed to be flat. Here, unless otherwise specified, the flat plate is a sheet metal made of metal.

In addition, as illustrated in FIG. 12, the first connector surface 221 is formed with openings 220a, 220b, and 220c, and the second connector surface 222 is formed with openings 220d, 220e, and 220f.

The opening 220a formed on the first connector surface 221 corresponds to the USB-Type-C receptacle connector 320a, the opening 220b formed on the first connector surface 221 corresponds to the USB-Type-A receptacle connector 320b, and the opening 220c formed on the first connector surface 221 corresponds to the USB-Type-A receptacle connector 320c.

The opening 220d formed on the second connector surface 222 corresponds to the USB-Type-B receptacle connector 320d.

The opening 220d formed on the second connector surface 222 corresponds to the USB-Type-B receptacle connector 320d, the opening 220e formed on the second connector surface 222 corresponds to a power supply connector 320e, and the opening 220f formed on the second connector surface 222 corresponds to a drawer kick (DK) receptacle connector 320f. The opening 220f may correspond to a local area network (LAN) receptacle connector.

The USB-Type-C receptacle connector 320a is electrically coupled to the external device 10a and can cause the external device 10a to communicate with the control section 30. Further, the USB-Type-C receptacle connector 320a is provided on the substrate 300, and the USB-Type-C receptacle connector 320a is mounted on the substrate 300 such that the outer circumference of the insertion port coincides with the inner circumference of the opening 220a. Accordingly, the concern that foreign matter such as dust and insects will enter the inside of the connector section 220 is reduced. The insertion port of the USB-Type-C receptacle connector 320a is arranged along the first connector surface 221.

The USB-Type-C receptacle connector 320a is provided with the CC terminal 63a, and unlike other USB standards, the host or the device is not clearly fixed between the printing apparatus 2 and the external device 10a coupled to the printing apparatus 2. In other words, the printing apparatus 2 may receive a command from the external device 10a to be operated, or may give a command to the external device 10a to operate the external device 10a. For example, the printing apparatus 2 may supply electric power to the external device 10a. As described above, since the printing apparatus 2 provided with the USB-Type-C receptacle connector 320a can be operated by either the host or the device, the convenience of the user who uses the printing apparatus 2 is improved.

The USB-Type-A receptacle connector 320b is electrically coupled to the external device 10b and can cause the external device 10b to communicate with the control section 30. Further, the USB-Type-A receptacle connector 320b is provided on the substrate 300, and the USB-Type-A receptacle connector 320b is mounted on the substrate 300 such that the outer circumference of the insertion port coincides with the inner circumference of the opening 220b. Accordingly, the concern that foreign matter such as dust and insects will enter the inside of the connector section 220 is reduced. The insertion port of the USB-Type-A receptacle connector 320b is arranged along the first connector surface 221.

The USB-Type-A receptacle connector 320c is electrically coupled to the external device 10c and can cause the external device 10c to communicate with the control section 30. Further, the USB-Type-A receptacle connector 320c is provided on the substrate 300, and the USB-Type-A receptacle connector 320c is mounted on the substrate 300 such that the outer circumference of the insertion port coincides with the inner circumference of the opening 220c. Accordingly, the concern that foreign matter such as dust and insects will enter the inside of the connector section 220 is reduced. The insertion port of the USB-Type-A receptacle connector 320c is arranged along the first connector surface 221.

The USB-Type-B receptacle connector 320d is electrically coupled to the external device 10d and can cause the external device 10d to communicate with the control section 30. Further, the USB-Type-B receptacle connector 320d is provided on the substrate 300, and the USB-Type-B receptacle connector 320d is mounted on the substrate 300 such that the outer circumference of the insertion port coincides with the inner circumference of the opening 220d. Accordingly, the concern that foreign matter such as dust and insects will enter the inside of the connector section 220 is reduced. The insertion port of the USB-Type-B receptacle connector 320d is arranged along the second connector surface 222 which is different from the first connector surface 221.

The power supply connector 320e is coupled to a commercial AC power source (not illustrated) to supply electric power to the control section 30. Further, the power supply connector 320e is provided on the substrate 300, and the power supply connector 320e is mounted on the substrate 300 such that the outer circumference of the insertion port coincides with the inner circumference of the opening 220e. Accordingly, the concern that foreign matter such as dust and insects will enter the inside of the connector section 220 can be reduced. The insertion port of the power supply connector 320e is arranged along the second connector surface 222 which is different from the first connector surface 221.

The DK receptacle connector 320f is, for example, as illustrated in FIG. 15, electrically coupled to a cash drawer 270 and causes the cash drawer 270 to communicate with the control section 30. Further, the DK receptacle connector 320f is provided on the substrate 300, and the DK receptacle connector 320f is mounted on the substrate 300 such that the outer circumference of the insertion port coincides with the inner circumference of the opening 220f. Accordingly, the concern that foreign matter such as dust and insects will enter the inside of the connector section 220 can be reduced. The insertion port of the DK receptacle connector 320f is arranged along the second connector surface 222 which is different from the first connector surface 221.

The inner circumferences of the opening 220a, the openings 220b and 220c, the opening 220d, the opening 220e, and the opening 220f are respectively designed to coincide with outer circumferences of the USB-Type-C receptacle connector 320a, the USB-Type-A receptacle connectors 320b and 320c, the USB-Type-B receptacle connector 320d, the power supply connector 320e, and the DK receptacle connector 320f. Therefore, the outer circumference of the insertion port and the inner circumference of the opening coincide with each other, respectively. However, when an error occurs due to manufacturing, the inner circumferences of each opening and the outer circumferences of the connectors corresponding to the openings will substantially coincide with each other, but since it is not an error due to the design, the above-mentioned substantial coincidence will be included in the coincidence.

1-6. USB Cable

Figure 13:
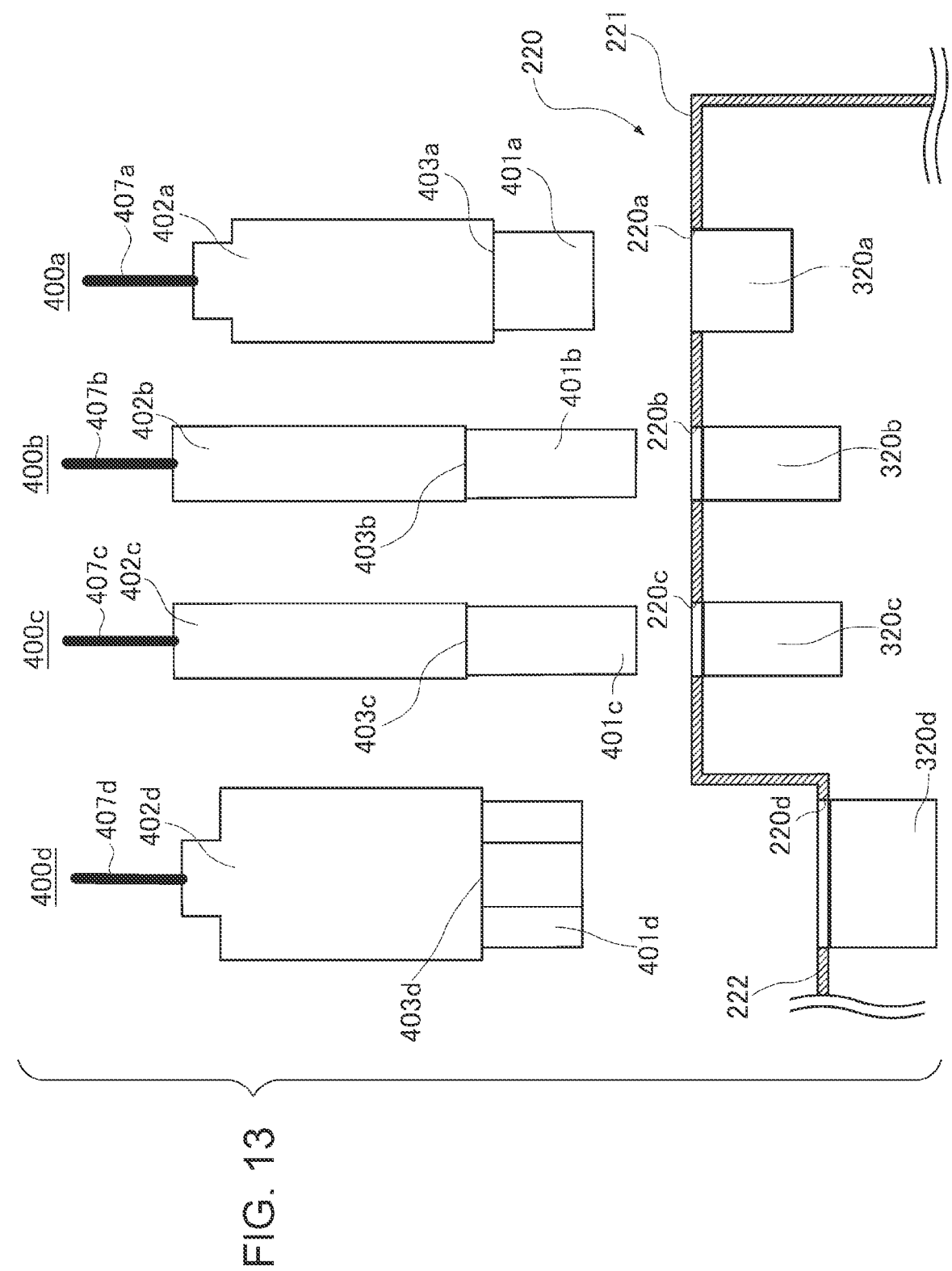
FIG. 13 is a view illustrating a part of various USB cables and a connector section.

Various USB cables will be described with reference to FIG. 13. FIG. 13 is a view illustrating a part of a cross section of various USB cables and the connector section 220.

The USB-Type-C cable 400a includes a plug 401a, a covering section 402a, and a coupling cable 407a. The plug 401a is electrically coupled to the coupling cable 407a, and the coupling part thereof is covered with the covering section 402a. The plug 401a is exposed from the end portion 403a of the covering section 402a and is coupled to the USB-Type-C receptacle connector 320a. Specifically, the plug 401a of the USB-Type-C cable 400a is inserted into the USB-Type-C receptacle connector 320a via the opening 220a.

The USB-Type-A cable 400b includes a plug 401b, a covering section 402b, and a coupling cable 407b. The plug 401b is electrically coupled to the coupling cable 407b, and the coupling part thereof is covered with the covering section 402b. The plug 401b is exposed from an end portion 403b of the covering section 402b and is coupled to the USB-Type-A receptacle connector 320b. Specifically, the plug 401b of the USB-Type-A cable 400b is inserted into the USB-Type-A receptacle connector 320b via the opening 220b.

The USB-Type-A cable 400c includes a plug 401c, a covering section 402c, and a coupling cable 407c. The plug 401c is electrically coupled to the coupling cable 407c, and the coupling part thereof is covered with the covering section 402c. The plug 401c is exposed from the end portion 403c of the covering section 402c and is coupled to the USB-Type-A receptacle connector 320c. Specifically, the plug 401c of the USB-Type-A cable 400c is inserted into the USB-Type-A receptacle connector 320c via the opening 220c.

The USB-Type-B cable 400d includes a plug 401d, a covering section 402d, and a coupling cable 407d. The plug 401d is electrically coupled to the coupling cable 407d, and the coupling part thereof is covered with the covering section 402d. The plug 401d is exposed from the end portion 403d of the covering section 402d and is coupled to the USB-Type-B receptacle connector 320d. Specifically, the plug 401d of the USB-Type-B cable 400d is inserted into the USB-Type-B receptacle connector 320d via the opening 220d.

2. Switching State of Host or Device of Printing Apparatus

Figure 14:
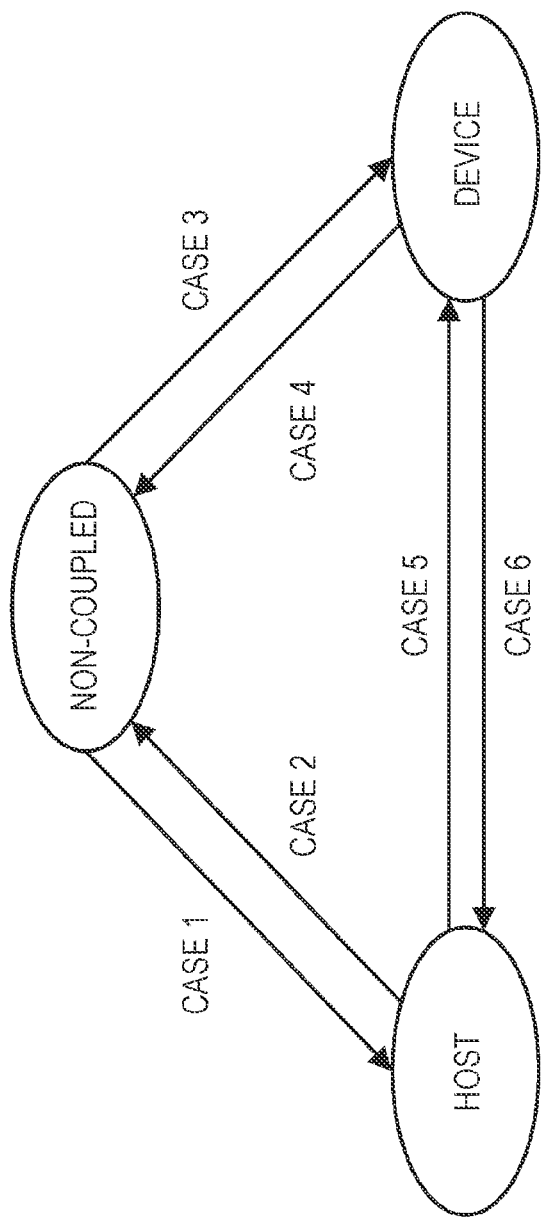
FIG. 14 is a state transition diagram of a host or a device of the printing apparatus.

The switching of the state of the host or the device of the printing apparatus 2 will be described with reference to FIG. 14. FIG. 14 is a state transition diagram of a host or a device of the printing apparatus 2.

2-1. Case 1. Host

Case 1 is a case where, for example, the external device 10a that functions as a device is coupled to the USB-Type-C receptacle connector 320a. In this case, the printing apparatus 2 is in the host state.

In Case 1, the USB controller 34 capable of communicating with the external device 10a that functions as a device transmits a control signal to the CPU 31, and the CPU 31 controls the printing apparatus 2 to be in the host state. In this case, for example, the printing apparatus 2 can supply electric power to the coupled external device 10a. Further, for example, when the external device 10a is the above-described customer display 3b, the printing apparatus 2 can display the price of the product purchased by the customer on the customer display 3b. That is, the printing apparatus 2 can display the content to be printed on the medium P on the customer display 3b.

2-2. Case 2. Non-Coupled State

Case 2 is a case where, for example, the coupling with the external device 10a that functions as a device is released to the USB-Type-C receptacle connector 320a. In this case, the printing apparatus 2 is not coupled to any of the external devices 10a to 10d, and is in a non-coupled state. That is, the printing apparatus 2 is in a so-called stand-alone state.

In Case 2, the printing apparatus 2 may be in either the device state or the host state. For example, it is preferable that the USB controller 34 transmit a control signal to the CPU 31, and the CPU 31 control the printing apparatus 2 so as to be in either the host state or the device state. When the printing apparatus 2 is in an indefinite state where the printing apparatus 2 is not fixed in either the host state or the device state, there is a concern that the operation of the printing apparatus 2 becomes unstable.

2-3. Case 3. Device

Case 3 is a case where, for example, the external device 10a or 10d that functions as a host is coupled to the USB-Type-C receptacle connector 320a or the USB-Type-B receptacle connector 320d. In this case, the printing apparatus 2 is in the device state.

In Case 3, the USB controller 34 capable of communicating with the external device 10a or 10d that functions as a host transmits a control signal to the CPU 31, and the CPU 31 controls the printing apparatus 2 to be in the device state. For example, when the external device 10a is the above-described smart device 3a, the smart device 3a transmits commands related to control and printing to the printing apparatus 2 to control the printing apparatus 2. Further, as the external device 10d, a host computer or the like for controlling the printing apparatus 2 is applied. In this case, the printing apparatus 2 executes printing according to the instruction of the host computer, which is the external device 10d, for example.

2-4. Case 4. Non-Coupled State

Case 4 is a case where, for example, the coupling with the external device 10a or 10d that functions as a host is released to the USB-Type-C receptacle connector 320a or the USB-Type-B receptacle connector 320d. In this case, the printing apparatus 2 is in a non-coupled state. That is, the printing apparatus 2 is in a so-called stand-alone state.

In Case 4, the printing apparatus 2 may be in either the device state or the host state. For example, it is preferable that the USB controller 34 transmit a control signal to the CPU 31, and the CPU 31 control the printing apparatus 2 so as to be in either the host state or the device state. When the printing apparatus 2 is in an indefinite state where the printing apparatus 2 is not fixed in either the host state or the device state, there is a concern that the operation of the printing apparatus 2 becomes unstable.

2-5. Case 5. Priority of Device State

Case 5 is a case where, for example, the external device 10d that functions as a host is coupled to the USB-Type-B receptacle connector 320d, in a state where the external device 10a that functions as a device is coupled to the USB-Type-C receptacle connector 320a. That is, Case 5 is a case where the external device 10d is further coupled. In this case, the printing apparatus 2 is in the device state.

In Case 5, the USB controller 34 stops communication with the external device 10a that functions as a device, and executes communication with the external device 10d that functions as a host. In addition, the USB controller 34 transmits a control signal to the CPU 31, and the CPU 31 controls the printing apparatus 2 so as to be in the device state. That is, the USB controller 34 performs control to give priority to the device state of the printing apparatus 2 rather than the host state.

In this manner, when the external device 10a that functions as a device and the external device 10d that functions as a host are coupled at the same time, the printing apparatus 2 stops communication with the external device 10a that functions as a device, and is in the device state. Therefore, since the host state of the device state do not coexist, the printing apparatus 2 can execute stable communication with the external device 10d that functions as a host.

2-6. Case 6. Priority of Host State

Case 6 is, for example, a case where the external device 10a is switched from the host state to the device state, or a case where the external device 10a that functions as a host is replaced to the external device 10a that functions as a device in a state where the external device 10a or 10d that functions as a host is coupled to the USB-Type-C receptacle connector 320a or the USB-Type-B receptacle connector 320d. In this case, the printing apparatus 2 is in the host state.

In Case 6, the USB controller 34 stops communication with the external device 10d that functions as a host, and executes communication with the external device 10a that functions as a device. In addition, the USB controller 34 transmits a control signal to the CPU 31, and the CPU 31 causes the printing apparatus 2 to function as a host. That is, the USB controller 34 gives priority to the host state of the printing apparatus 2 rather than the device state.

In this manner, when the external device 10a that functions as a device and the external device 10d that functions as a host are coupled at the same time, the printing apparatus 2 stops communication with the external device 10d that functions as a host, and is in the host state. Therefore, since the host state of the device state do not coexist, the printing apparatus 2 can execute stable communication with the external device 10a that functions as a device.

As described above, regarding the USB controller 34, in Cases 1 to 6 described above, the USB controller 34 performs control such that the printing apparatus 2 is in either the host state or the device state, respectively. Therefore, the host state and the device state do not coexist, and the printing apparatus 2 can perform stable communication with the external device coupled so as to be able to communicate.

2-7. CC Terminal

As described above, the USB-Type-C receptacle connector 320a has the CC terminal 63a, and the CC terminal 63a is a terminal for identifying whether the coupled external device 10a is in the host state or the device state. Therefore, the USB controller 34 can identify whether the external device 10*a* coupled to the printing apparatus 2 is in the device state or the host state.

For example, when the external device 10*a* is not coupled to the USB-Type-C receptacle connector 320*a* and the external device 10*d* is coupled to the USB-Type-B receptacle connector 320*d*, the USB controller 34 fixes the potential of the CC terminal 63*a*. That is, the USB controller 34 stops the function of the DRP controller 343.

In this case, the printing apparatus 2 is controlled to be in the state of the device, but further, when the external device 10*a* is coupled to the USB-Type-C receptacle connector 320*a*, the USB controller 34 gives priority to the device state of the printing apparatus 2, does not communicate with the external device 10*a* that functions as a device, and communicates with the external device 10*a* that functions as a host. In this manner, by giving priority to the device state of the printing apparatus 2, the USB controller 34 can prevent the device state and the host state from coexisting in the printing apparatus 2.

Further, when the external device 10*a* is not coupled to the USB-Type-C receptacle connector 320*a* and the external device 10*d* is coupled to the USB-Type-B receptacle connector 320*d*, the printing apparatus 2 is controlled to be in the device state.

At this time, the USB controller 34 may alternately switch the potential of the CC terminal 63*a* between the first potential E1 and the second potential E2 at regular intervals. For example, when the external device 10*a* that functions as a device is coupled to the USB-Type-C receptacle connector 320*a*, the USB controller 34 may switch the printing apparatus 2 from the device state to the host state. By giving priority to the host state of the printing apparatus 2, the USB controller 34 can prevent the device state and the host state from coexisting in the printing apparatus 2.

Further, when the external device 10*a* is not coupled to the USB-Type-C receptacle connector 320*a* and the external device 10*d* is not coupled to the USB-Type-B receptacle connector 320*d*, the printing apparatus 2 is controlled to be in either the host state or the device state.

At this time, the USB controller 34 may alternately switch the potential of the CC terminal 63*a* between the first potential E1 and the second potential E2 at regular intervals. When the USB controller 34 does not stop the DRP controller 343 and the external device 10*a* is coupled to the USB-Type-C receptacle connector 320*a*, the USB controller 34 may switch the host state or the device state of the printing apparatus 2 according to the host state or the device state of the external device 10*a*.

Specifically, the USB controller 34 controls the printing apparatus 2 to be in the device state when the external device 10*a* functions as a host, and controls the printing apparatus 2 to be in the host state when the external device 10*a* functions as a device.

The external device that functions as either a host or a device is not limited to the external device 10*a* coupled to the USB-Type-C receptacle connector 320*a*. External devices 10*a*, 10*c*, and 10*d* coupled to the USB-Type-A receptacle connectors 320*b* and 320*c* or the USB-Type-B receptacle connector 320*d* by a so-called special receptacle connector or the like may have both a host function and a device function.

Further, the USB equipment provided with the USB device may also be configured to switch the host state or the device state of the USB equipment as described above. In this case, the USB equipment corresponds to the printing apparatus 2, and the USB device corresponds to the CPU 31.

3. Modification Example

FIG. 15 is a view illustrating a hardware configuration of USB controllers 34*a* and 34*b* of a modification example.

Unlike the first embodiment, the control section 30 of the printing apparatus 2 includes the USB controller 34*a* having a first integrated circuit 346*a* and the USB controller 34*b* having a second integrated circuit 346*b*.

The USB controller 34*a* includes a device controller 341*a* and a host controller 342*a*, and does not include a DRP controller. That is, since the USB controller 34*a* cannot recognize the potential of the CC terminal 63*a* of the USB-Type-C receptacle connector 320*a*, the USB controller 34*a* is not configured to be coupled to the USB-Type-C interface 60*a* to be capable of communicating therewith.

Therefore, for example, the electric signal transmitted via the signal path 348 is an electric signal from the external devices 10*b* and 10*c* electrically coupled to the USB-Type-A interfaces 60*b* and 60*c* and the external device 10*d* electrically coupled to the USB-Type-B interface 60*d*. In this case, the electric signal transmitted via the signal path 348 is an electric signal from the external device that functions as a host.

This electric signal is input to the first integrated circuit 346*a*. The first integrated circuit 346*a* generates a control signal based on the input electric signal, and transmits the generated control signal to the CPU 31 via the system bus 41. Based on this control signal, the USB controller 34*a* controls the printing apparatus 2 to be in the device state.

The USB controller 34*b* includes a device controller 341*b*, a host controller 342*b*, and a DRP controller 343*b*. That is, since the USB controller 34*b* can recognize the potential of the CC terminal 63*a*, the USB controller 34*b* may be configured to be coupled to the USB-Type-C interface 60*a* to be capable of communicating therewith.

Therefore, for example, the electric signal transmitted via the signal path 349 is an electric signal from the external device 10*a* electrically coupled to the USB-Type-C interface 60*a*. In this case, the electric signal transmitted via the signal path 349 is an electric signal from the external device that functions as a host or a device.

This electric signal is input to the second integrated circuit 346*b*. The second integrated circuit 346*b* generates a control signal based on the input electric signal, and transmits the generated control signal to the CPU 31 via the system bus 41. Based on this control signal, the USB controller 34*b* controls the printing apparatus 2 to be in the host state or the device state.

Further, the second integrated circuit 346*b* may be configured to transmit the generated control signal to the first integrated circuit 346*a* via the signal path 350 and to the CPU 31 via the first integrated circuit 346*a* and the system bus 41. That is, the USB controller 34*b* may be configured to transmit the generated control signal to the CPU 31, or may be configured to transmit the generated control signal to the CPU 31 via the USB controller 34*a*.

In the modification example, the USB controller 34*a* is configured to be coupled to the USB-Type-A interfaces 60*b* and 60*c* and the USB-Type-B interface 60*d* to be capable of communicating therewith, and the USB controller 34*b* is configured to be coupled to the USB-Type-C interface 60*a* to be capable of communicating therewith.

Since the external devices 10*b*, 10*c*, and 10*d* do not need to be coupled to the DRP controller to be capable of communicating therewith, the USB controller 34*a* can omit the DRP controller. In this manner, since the USB controller is separated depending on whether or not an external device that needs to be controlled by the DRP controller is coupled, the role of each USB controller can be clarified, and the configuration of each USB controller can be simplified. Further, by separating the USB controller in this manner, it is possible to appropriately control the host state or the device state of the printing apparatus 2 according to the state of each external device coupled to the printing apparatus 2 to be capable of communicating therewith.

The USB-Type-B receptacle connector 320d is an example of the first receptacle connector. The USB-Type-C receptacle connector 320a is an example of the second receptacle connector. The external device 10a is an example of the first external device. The external device 10d is an example of the second external device. The CPU 31 is an example of an arithmetic section. The electric signal transmitted via the signal path 348 is an example of a first electric signal. The electric signal transmitted via the signal path 349 is an example of a second electric signal.

The embodiments and the modification examples have been described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments and modification examples.

According to an aspect of the present disclosure, there is provided a printing apparatus including: a first receptacle connector that couples a first external device that functions as a host and an arithmetic section to communicate with each other; a second receptacle connector that couples a second external device that functions as the host or a device and the arithmetic section to communicate with each other; and a USB controller that causes the arithmetic section to function as the device or the host based on a first electric signal input from the first external device via the first receptacle connector and a second electric signal input from the second external device via the second receptacle connector, in which, when the first external device and the first receptacle connector are coupled, the USB controller causes the arithmetic section to function not as the host but as the device when the second external device that functions as the device is coupled to the second receptacle connector, causes the arithmetic section to function as the device when the second external device that functions as the host is coupled to the second receptacle connector, and causes the arithmetic section to function as the device when the second external device is not coupled to the second receptacle connector.

According to this printing apparatus, when the first external device that functions as a host is coupled to the printing apparatus, the second external device coupled to the printing apparatus functions as both a host and a device. However, the USB controller can cause the arithmetic section to function as a device and put the printing apparatus in the device state. When the second external device is not coupled to the printing apparatus, the USB controller can cause the arithmetic section to function as a device, set the printing apparatus to the device state, and fix the state of the printing apparatus. That is, when the first external device that functions as a host is coupled to the printing apparatus, the printing apparatus can maintain the device state and stably communicate with the coupled external device.

According to the aspect of the printing apparatus, the second receptacle connector may have a CC terminal, when the second external device is not coupled to the second receptacle connector and the first external device is coupled to the first receptacle connector, the USB controller may fix a potential of the CC terminal, and when the second external device is not coupled to the second receptacle connector and the first external device is not coupled to the first receptacle connector, the USB controller may change the potential of the CC terminal at regular intervals.

According to this printing apparatus, when the first external device that functions as a host is coupled, even when the second external device that functions as a device is coupled, the USB controller causes the arithmetic section to function as a device and puts the printing apparatus in the device state. That is, when the first external device is coupled as a host, the printing apparatus can maintain the device state and stably communicate with the coupled external device. Further, when the first external device is not coupled, the USB controller changes the potential of the CC terminal at regular intervals, and thus the second external device can function as either a host or a device. As a result, the printing apparatus can operate as the host or the device according to the function of the host or device of the second external device, and thus the convenience of the user who uses the printing apparatus is improved.

According to the aspect of the printing apparatus, in a state where the first external device is not coupled to the first receptacle connector, the second external device that functions as the device is coupled to the second receptacle connector, and the arithmetic section functions as the host, when the first external device is coupled to the first receptacle connector, the USB controller may stop communication between the second external device that functions as the device and the arithmetic section, and may execute communication between the first external device and the arithmetic section.

According to this printing apparatus, when the second external device is coupled, the first external device that functions as a host is coupled regardless of whether the second external device functions as a host or a device. At this time, the USB controller can stop the communication with the second external device and preferentially execute the communication with the first external device. As a result, the printing apparatus is fixed in the device state, and the state of the printing apparatus can be stabilized.

According to the aspect of the printing apparatus, the USB controller may have a first integrated circuit, the first electric signal and the second electric signal may be input to the first integrated circuit, the first integrated circuit may output a control signal to the arithmetic section, and the arithmetic section may function as the device or the host based on the control signal.

According to this printing apparatus, the first electric signal from the first external device and the second electric signal from the second external device are integrated into one first integrated circuit, and thus the control mechanism by the USB controller can be simplified. As a result, the state of the printing apparatus can be fixed more easily.

According to the aspect of the printing apparatus, the USB controller may have a first integrated circuit and a second integrated circuit, the first electric signal may be input to the first integrated circuit, the second electric signal may be input to the second integrated circuit, the second integrated circuit may output the control signal to the arithmetic section via the first integrated circuit, and the arithmetic section may function as the device or the host based on the control signal.

According to this printing apparatus, the first electric signal from the first external device and the second electric signal from the second external device are separately input to the first integrated circuit and the second integrated circuit. Therefore, the first integrated circuit and the second integrated circuit may each have a required circuit. That is, the first integrated circuit may have a circuit having a function corresponding to the first external device, the second integrated circuit may have a circuit having a function corresponding to the second external device, and the control of the first external device and the second external device becomes easy. Further, since the control signal is output from the second integrated circuit to the arithmetic section via the first integrated circuit, the host state or the device state of the first external device, the second external device, and the printing apparatus can be appropriately controlled.

According to another aspect of the present disclosure, there is provided USB equipment including: a first receptacle connector that couples a first external device that functions as a host and a USB device to communicate with each other; a second receptacle connector that couples a second external device that functions as the host or a device and the USB device to communicate with each other; and a USB controller that causes the USB device to function as the device or the host based on a first electric signal input from the first external device via the first receptacle connector and a second electric signal input from the second external device via the second receptacle connector, in which, when the first external device and the first receptacle connector are coupled, the USB controller causes the USB device to function not as the host but as the device when the second external device that functions as the device is coupled to the second receptacle connector, causes the USB device to function as the device when the second external device that functions as the host is coupled to the second receptacle connector, and causes the USB device to function as the device when the second external device is not coupled to the second receptacle connector.

According to this USB equipment, when the first external device that functions as a host is coupled to the printing apparatus, the second external device coupled to the printing apparatus functions as both a host and a device. However, the USB controller can cause the USB device to function as a device and put the printing apparatus in the device state. When the second external device is not coupled to the printing apparatus, the USB controller can cause the USB device to function as a device, set the printing apparatus to the device state, and fix the state of the printing apparatus. That is, when the first external device that functions as a host is coupled to the printing apparatus, the printing apparatus can maintain the device state and stably communicate with the coupled external device.

According to the aspect of the USB equipment, the second receptacle connector may have a CC terminal, when the second external device is not coupled to the second receptacle connector and the first external device is coupled to the first receptacle connector, the USB controller may fix a potential of the CC terminal, and when the second external device is not coupled to the second receptacle connector and the first external device is not coupled to the first receptacle connector, the USB controller may change the potential of the CC terminal at regular intervals.

According to this USB equipment, when the first external device that functions as a host is coupled, even when the second external device that functions as a device is coupled, the USB controller causes the USB device to function as a device and puts the printing apparatus in the device state. That is, when the first external device is coupled as a host, the printing apparatus can maintain the device state and stably communicate with the coupled external device. Further, when the first external device is not coupled, the USB controller changes the potential of the CC terminal at regular intervals, and thus the second external device can function as either a host or a device. As a result, the printing apparatus can operate as the host or the device according to the function of the host or device of the second external device, and thus the convenience of the user who uses the printing apparatus is improved.

According to the aspect of the USB equipment, in a state where the first external device is not coupled to the first receptacle connector, the second external device that functions as the device is coupled to the second receptacle connector, and the USB device functions as the host, when the first external device is coupled to the first receptacle connector, the USB controller may stop communication between the second external device that operates as the device and the USB device, and may execute communication between the first external device and the USB device.

According to this USB equipment, when the second external device is coupled, the first external device that functions as a host is coupled regardless of whether the second external device functions as a host or a device. At this time, the USB controller can stop the communication with the second external device and preferentially execute the communication with the first external device. As a result, the printing apparatus is fixed in the device state, and the state of the printing apparatus can be stabilized.

According to the aspect of the USB equipment, the USB controller may have a first integrated circuit, the first electric signal and the second electric signal may be input to the first integrated circuit, the first integrated circuit may output a control signal to the USB device, and the USB device may function as the device or the host based on the control signal.

According to this USB equipment, the first electric signal from the first external device and the second electric signal from the second external device are integrated into one first integrated circuit, and thus the control mechanism by the USB controller can be simplified. As a result, the state of the printing apparatus can be fixed more easily.

According to the aspect of the USB equipment, the USB controller may have a first integrated circuit and a second integrated circuit, the first electric signal may be input to the first integrated circuit, the second electric signal may be input to the second integrated circuit, the second integrated circuit may output the control signal to the USB device via the first integrated circuit, and the USB device may function as the device or the host based on the control signal.

According to this USB equipment, the first electric signal from the first external device and the second electric signal from the second external device are separately input to the first integrated circuit and the second integrated circuit. Therefore, the first integrated circuit and the second integrated circuit may each have a required circuit. That is, the first integrated circuit may have a circuit having a function corresponding to the first external device, the second integrated circuit may have a circuit having a function corresponding to the second external device, and the control of the first external device and the second external device becomes easy. Further, since the control signal is output from the second integrated circuit to the arithmetic section via the first integrated circuit, the host state or the device state of the first external device, the second external device, and the printing apparatus can be appropriately controlled.

What is claimed is:

1. A printing apparatus comprising:
a first receptacle connector that couples a first external device that functions as a host and an arithmetic section to communicate with each other;
a second receptacle connector that couples a second external device that functions as the host or a device and the arithmetic section to communicate with each other; and
a USB controller that causes the arithmetic section to function as the device or the host based on a first electric signal input from the first external device via the first receptacle connector and a second electric signal input from the second external device via the second receptacle connector, wherein
when the first external device and the first receptacle connector are coupled, the USB controller
causes the arithmetic section to function not as the host but as the device when the second external device that functions as the device is coupled to the second receptacle connector,
causes the arithmetic section to function as the device when the second external device that functions as the host is coupled to the second receptacle connector, and
causes the arithmetic section to function as the device when the second external device is not coupled to the second receptacle connector.

2. The printing apparatus according to claim 1, wherein the second receptacle connector has a CC terminal,
when the second external device is not coupled to the second receptacle connector and the first external device is coupled to the first receptacle connector, the USB controller fixes a potential of the CC terminal, and
when the second external device is not coupled to the second receptacle connector and the first external device is not coupled to the first receptacle connector, the USB controller changes the potential of the CC terminal at regular intervals.

3. The printing apparatus according to claim 1, wherein in a state where the first external device is not coupled to the first receptacle connector, the second external device that functions as the device is coupled to the second receptacle connector, and the arithmetic section functions as the host, when the first external device is coupled to the first receptacle connector, the USB controller stops communication between the second external device that functions as the device and the arithmetic section, and executes communication between the first external device and the arithmetic section.

4. The printing apparatus according to claim 1, wherein the USB controller has an integrated circuit,
the first electric signal and the second electric signal are input to the integrated circuit,
the integrated circuit outputs a control signal to the arithmetic section, and
the arithmetic section functions as the device or the host based on the control signal.

5. The printing apparatus according to claim 1, wherein the USB controller has a first integrated circuit and a second integrated circuit,
the first electric signal is input to the first integrated circuit,
the second electric signal is input to the second integrated circuit,
the second integrated circuit outputs a control signal to the arithmetic section via the first integrated circuit, and
the arithmetic section functions as the device or the host based on the control signal.

6. USB equipment comprising:
a first receptacle connector that couples a first external device that functions as a host and a USB device to communicate with each other;
a second receptacle connector that couples a second external device that functions as the host or a device and the USB device to communicate with each other; and
a USB controller that causes the USB device to function as the device or the host based on a first electric signal input from the first external device via the first receptacle connector and a second electric signal input from the second external device via the second receptacle connector, wherein
when the first external device and the first receptacle connector are coupled, the USB controller
causes the USB device to function not as the host but as the device when the second external device that functions as the device is coupled to the second receptacle connector,
causes the USB device to function as the device when the second external device that functions as the host is coupled to the second receptacle connector, and
causes the USB device to function as the device when the second external device is not coupled to the second receptacle connector.

7. The USB equipment according to claim 6, wherein the second receptacle connector has a CC terminal,
when the second external device is not coupled to the second receptacle connector and the first external device is coupled to the first receptacle connector, the USB controller fixes a potential of the CC terminal, and
when the second external device is not coupled to the second receptacle connector and the first external device is not coupled to the first receptacle connector, the USB controller changes the potential of the CC terminal at regular intervals.

8. The USB equipment according to claim 6, wherein in a state where the first external device is not coupled to the first receptacle connector, the second external device that functions as the device is coupled to the second receptacle connector, and the USB device functions as the host, when the first external device is coupled to the first receptacle connector, the USB controller stops communication between the second external device that operates as the device and the USB device, and executes communication between the first external device and the USB device.

9. The USB equipment according to claim 6, wherein the USB controller has an integrated circuit,
the first electric signal and the second electric signal are input to the integrated circuit,
the integrated circuit outputs a control signal to the USB device, and
the USB device functions as the device or the host based on the control signal.

10. The USB equipment according to claim 6, wherein
the USB controller has a first integrated circuit and a second integrated circuit,
the first electric signal is input to the first integrated circuit,
the second electric signal is input to the second integrated circuit,
the second integrated circuit outputs a control signal to the USB device via the first integrated circuit, and
the USB device functions as the device or the host based on the control signal.

* * * * *